(12) United States Patent
Tang et al.

(10) Patent No.: US 12,183,010 B2
(45) Date of Patent: Dec. 31, 2024

(54) SYSTEMS AND METHODS FOR INSTANCE SEGMENTATION BASED ON SEMANTIC SEGMENTATION

(71) Applicant: BEIJING DIDI INFINITY TECHNOLOGY AND DEVELOPMENT CO., LTD., Beijing (CN)

(72) Inventors: Jian Tang, Beijing (CN); Chengxiang Yin, Beijing (CN); Kun Wu, Beijing (CN); Zhengping Che, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 371 days.

(21) Appl. No.: 17/651,243

(22) Filed: Feb. 16, 2022

(65) Prior Publication Data

US 2022/0172369 A1    Jun. 2, 2022

Related U.S. Application Data

(63) Continuation of application No. PCT/CN2019/110539, filed on Oct. 11, 2019.

(51) Int. Cl.
*G06T 7/10* (2017.01)
*G06N 3/08* (2023.01)
*G06V 10/764* (2022.01)

(52) U.S. Cl.
CPC ............. *G06T 7/10* (2017.01); *G06N 3/08* (2013.01); *G06V 10/764* (2022.01); *G06T 2207/20084* (2013.01)

(58) Field of Classification Search
CPC ............. G06T 7/10; G06T 2207/20084; G06T 7/1113; G06V 10/764; G06V 10/765;
(Continued)

(56) References Cited

U.S. PATENT DOCUMENTS 10,430,946 B1    10/2019  Zhou et al.
2018/0089815 A1   3/2018  Hu et al.
(Continued)

FOREIGN PATENT DOCUMENTS

CN    109583517 A    4/2019
CN    109615632 A    4/2019
(Continued)

OTHER PUBLICATIONS

Mittal, S., Tatarchenko, M., & Brox, T. (2019). Semi-Supervised Semantic Segmentation With High- and Low-Level Consistency. IEEE Transactions on Pattern Analysis and Machine Intelligence, 43, 1369-1379 (Year: 2019).*

(Continued)

*Primary Examiner* — Vu Le
*Assistant Examiner* — Jack Peter Kraynak
(74) *Attorney, Agent, or Firm* — METIS IP LLC

(57) ABSTRACT

The present disclosure relates to a system and a method for performing instance segmentation based on semantic segmentation that is capable of (1) processing HD images in real-time given semantic segmentation; 2) delivering comparable performance with Mask R-CNN in terms of accuracy when combined with a widely-used semantic segmentation method (such as DPC), while consistently outperforms a state-of-the-art real-time solution; (3) working flexibly with any semantic segmentation model for instance segmentation; (4) outperforming Mask R-CNN if the given semantic segmentation is sufficiently good; and (5) being easily extended to panoptic segmentation.

17 Claims, 11 Drawing Sheets

(58) Field of Classification Search
CPC .......... G06N 3/08; G06N 3/0895; G06N 3/09;
G06N 3/091; G06N 3/092; G06N 3/094;
G06N 3/096; G06N 3/098
See application file for complete search history.

(56) References Cited

U.S. PATENT DOCUMENTS

| | | | |
|---|---|---|---|
| 2019/0065867 A1 | 2/2019 | Huang et al. | |
| 2019/0198156 A1 | 6/2019 | Madani et al. | |
| 2019/0244060 A1 | 8/2019 | Dundar et al. | |
| 2019/0304098 A1* | 10/2019 | Chen | G06F 18/2413 |
| 2020/0294240 A1 | 9/2020 | Wang et al. | |

FOREIGN PATENT DOCUMENTS

| | | | |
|---|---|---|---|
| CN | 110008915 A | 7/2019 | |
| CN | 110175613 A | 8/2019 | |
| CN | 110188817 A | 8/2019 | |
| WO | 2018086761 A1 | 5/2018 | |
| WO | WO-2018232592 A1 * | 12/2018 | |

OTHER PUBLICATIONS

Chen, L., Collins, M.D., Zhu, Y., Papandreou, G., Zoph, B., Schroff, F., Adam, H., & Shlens, J. (2018). Searching for Efficient Multi-Scale Architectures for Dense Image Prediction. Neural Information Processing Systems (Year: 2018).*
Li, J., Raventós, A., Bhargava, A., Tagawa, T., & Gaidon, A. (2018). Learning to Fuse Things and Stuff (Year: 2018).*
De Geus, D., Meletis, P., & Dubbelman, G. (2019). Single Network Panoptic Segmentation for Street Scene Understanding. 2019 IEEE Intelligent Vehicles Symposium (IV), 709-715 (Year: 2019).*
He, K., Gkioxari, G., Dollár, P., & Girshick, R.B. (2017). Mask R-CNN. 2017 IEEE International Conference on Computer Vision (ICCV), 2980-2988 (Year: 2017).*
Kirillov, Alexander & Levinkov, Evgeny & Andres, Bjoern & Savchynskyy, Bogdan & Rother, Carsten. (2017). InstanceCut: From Edges to Instances with MultiCut. 7322-7331. 10.1109/CVPR.2017.774. (Year: 2017).*
Qi, M., Wang, Y., Qin, J., & Li, A. (2019). KE-GAN: Knowledge Embedded Generative Adversarial Networks for Semi-Supervised Scene Parsing. 2019 IEEE/CVF Conference on Computer Vision and Pattern Recognition (CVPR), 5232-5241. (Year: 2019).*
Scott Drew Pendleton et al., Perception, Planning, Control, and Coordination for Autonomous Vehicles, Machines, 2017, 54 pages.
Mehdi Mirza et al., Conditional Generative Adversarial Nets, arXiv:1411.1784v1, 2014, 7 pages.
Mao, Xudong et al., Least Squares Generative Adversarial Networks, arXiv:1611.04076v3, 2017, 16 pages.
Lee, Chenyu et al., Deeply-Supervised Nets, arXiv:1409.5185v2, 2014, 10 pages.
Jonas Uhrig et al., Box2Pix: Single-Shot Instance Segmentation by Assigning Pixels to Object Boxes, IEEE Intelligent Vehicles Symposium (IV), 2018, 8 pages.
Zhao, Hengshuang et al., Pyramid Scene Parsing Network, arXiv:1612.01105v2, 2017, 11 pages.
Abhlnav Valada et al., Self-Supervised Model Adaptation for Multimodal Semantic Segmentation, International Journal of Computer Vision, 2018, 47 pages.
Chen, Liangchieh et al., Encoder-Decoder with Atrous Separable Convolution for Semantic Image Segmentation, arXiv:1802.02611v3, 2018, 18 pages.
Chen, Liangchieh et al., Searching for Efficient Multi-Scale Architectures for Dense Image Prediction, arXiv:1809.04184v1, 2018, 14 pages.
Wang, Tingchun et al., High-Resolution Image Synthesis and Semantic Manipulation with Conditional GANs, arXiv:1711.11585v2, 2018, 14 pages.

Phillip Isola et al., Image-to-Image Translation with Conditional Adversarial Networks, arXiv:1611.07004v1, 2016, 16 pages.
Justin Johnson et al., Perceptual Losses for Real-Time Style Transfer and Super-Resolution, arXiv:1603.08155v1, 2016, 18 pages.
Xie, Saining et al., Holistically-Nested Edge Detection, arXiv:1504.06375v2, 2015, 10 pages.
Jonathan Long et al., Fully Convolutional Networks for Semantic Segmentation, arXiv:1411.4038v2, 2015, 10 pages.
Diederik P.Kingma et al., Adam: a Method for Stochastic Optimization, arXiv:1412.6980v9, 2017, 15 pages.
He, Kaiming et al., Mask R-CNN, arXiv:1703.06870v3, 2018, 12 pages.
Liu, Shu et al., SGN: Sequential Grouping Networks for Instance Segmentation, IEEE Xplore, 3496-3504, 2017.
Anurag Arnab et al., Pixelwise Instance Segmentation with a Dynamically Instantiated Network, IEEE Xplore, 441-450, 2017.
Bai, Min et al., Deep Watershed Transform for Instance Segmentation, arXiv:1611.08303v2, 2017, 9 pages.
Bert De Brabandere et al., Semantic Instance Segmentation with a Discriminative Loss Function, arXiv:1708.02551v1, 2017, 10 pages.
Zeeshan Hayder et al., Boundary-aware Instance Segmentation, arXiv:1612.03129v2, 2017, 9 pages.
Lin, Tsungyi et al., Microsoft COCO: Common Objects in Context, arXiv:1405.0312v2, 2014, 14 pages.
"The Cityscapes Dataset", Web page <https://www.cityscapes-dataset.com/>, Sep. 2019.
Marius Cordts et al., The Cityscapes Dataset for Semantic Urban Scene Understanding, the IEEE CVPR, 3213-3223, 2016.
"Cordts, M", Web page <https://github.com/mcordts/cityscapesScripts>, 2016.
Dai, Jifeng et al., Instance-aware Semantic Segmentation via Multi-task Network Cascades, the IEEE CVPR, 3150-3158, 2016.
"Deep Scene Seg", Web page <https://github.com/DeepSceneSeg/AdapNet-pp>, 2018.
"Facebook Research", Web page <https://github.com/facebookresearch/Detectron>, 2017.
Alexander Kirillov et al., InstanceCut: from Edges to Instances with MultiCut, the IEEE CVPR, 5008-5017, 2017.
Alexander Kirillov et al., Panoptic Segmentation, the IEEE CVPR, 9404-9413, 2019.
Kong, Shu et al., Recurrent Pixel Embedding for Instance Grouping, the IEEE CVPR, 9018-9028, 2018.
Li, Jie et al., Learning to Fuse Things and Stuff, arXiv:1812.01192v2, 2019, 13 pages.
Li, Yanwei et al., Attention-guided Unified Network for Panoptic Segmentation, the IEEE CVPR, 7026-7035, 2019.
Liang, Xiaodan et al., Proposal-free Network for Instance-levelnObject Segmentation, arXiv:1509.02636v2, 2018, 14 pages.
Liu, Shu et al., Path Aggregation Network for Instance Segmentation, the IEEE CVPR, 8759-8768, 2018.
"Nabavi, S", Web page <https://github.com/shahabty/PSPNet-Pytorch>, 2018.
Natalia Neverova et al., Multi-scale Deep Learning for Gesture Detection and Localization, Springer International Publishing Switzerland, 474-490, 2015.
Ren, Mengye et al., End-to-End Instance Segmentation with Recurrent Attention, the IEEE CVPR, 6656-6664, 2017.
Bernardino Romera-Paredes et al., Recurrent instance segmentation, arXiv:1511.08250v3, 2016, 24 pages.
"Tensor flow", Web page <https://github.com/tensorflow/models/tree/master/research/deeplab>, 2018.
Xiong, Yuwen et al., UPSNet: A Unified Panoptic Segmentation Network, the IEEE CVPR, 8818-8826, 2019.
Zhang, Ziyu et al., Monocular Object Instance Segmentation and Depth Ordering with CNNs, the IEEE CVPR, 2614-2622, 2015.
International Search Report in PCT/CN2019/110539 mailed on Jul. 10, 2020, 5 pages.
Written Opinion in PCT/CN2019/110539mailed on Jul. 10, 2020, 5 pages.

* cited by examiner

SYSTEMS AND METHODS FOR INSTANCE SEGMENTATION BASED ON SEMANTIC SEGMENTATION

CROSS-REFERENCE TO RELATED APPLICATIONS

This application is a Continuation of International Application No. PCT/CN2019/110539, filed on Oct. 11, 2019, the contents of which are incorporated herein by reference in their entirety.

TECHNICAL FIELD

The present disclosure generally relates to systems and methods for performing instance segmentation based on semantic segmentation, and in some embodiments, to systems and methods for autonomous driving.

BACKGROUND

Instance segmentation can be considered as an extended task of object detection. The popular detect-and-segment approaches for instance segmentation, such as Mask R-CNN, first conducts object detection to localize each individual object using a bounding box, and then assigns a binary label to each pixel in the box. Although such methods have gained their popularity because of high accuracies, they are usually slow due to high model complexity and long latency for dealing with object proposals. Inference latency, however, is critical to many real-time applications such as autonomous driving. There remains a need to avoid high complexity and long latency mentioned above, especially in real-time applications such as autonomous driving.

SUMMARY

According to a first aspect of the present disclosure, a system for obtaining an instance segmentation or panoptic segmentation of an image based on semantic segmentation is disclosed herein. The system comprises a storage medium storing a set of instructions; and a processor in communication with the storage medium to execute the set of instructions to: perform semantic segmentation on an input image to obtain semantic label map having specific set of classes, using a trained semantic segmentation model; generate a boundary map, using a trained generator, based on the obtained semantic label map concatenated with the input image; and process the boundary map, using a post-processing step, to differentiate objects of the specific set of classes to obtain the instance segmentation or panoptic segmentation of the input image.

In some embodiments, the trained semantic segmentation model is DeepLabv3+ or dense prediction cell (DPC). In some embodiments, the trained generator comprises a conditional Generative Adversarial Networks (GANs) coupled with deep supervision as well as a weighted fusion layer. In some embodiments, the system is able to obtain instance segmentation or panoptic segmentation in real time. In some embodiments, the post-processing step comprises performing Breadth-First-Search for each enclosed area of the semantic label map to get a mask for each enclosed area, whose class is determined based on its semantic label map. In some embodiments, the set of instructions further instructs the processor to generate masks for at least one of thing classes and stuff classes. In some embodiments, the system further comprises a discriminator that engages in a minimax game with a generator to form the trained generator, wherein the discriminator distinguishes between a boundary map generated by the trained generator and a corresponding boundary map of ground truth.

According to a second aspect of the present disclosure, a method for obtaining an instance segmentation or panoptic segmentation of an image based on semantic segmentation, on a computing device including a storage medium storing a set of instructions, and a processor in communication with the storage medium to execute the set of instructions is disclosed. The method comprises the steps of performing semantic segmentation on an input image to obtain semantic label map having specific set of classes, using a trained semantic segmentation model; generating a boundary map, using a trained generator, based on the obtained semantic label map concatenated with the input image; and processing the boundary map, using a post-processing step, to differentiate objects of the specific set of classes to obtain the instance segmentation or panoptic segmentation of the image.

In some embodiments, the trained semantic segmentation model is DeepLabv3+ or dense prediction cell (DPC). In some embodiments, the trained generator comprises a conditional Generative Adversarial Networks (GANs) coupled with deep supervision as well as a weighted fusion layer. In some embodiments, the method is able to obtain instance segmentation or panoptic segmentation in real time. In some embodiments, the post-processing step comprises performing Breadth-First-Search for each enclosed area of the semantic label map to get a mask for each enclosed area, whose class is determined based on its semantic label map. In some embodiments, the set of instructions further instructs the processor to generate masks for at least one of thing classes and stuff classes. In some embodiments, the method further comprises a discriminator that engages in a minimax game with a generator to form the trained generator, wherein the discriminator distinguishes between a boundary map generated by the trained generator and a corresponding boundary map of ground truth.

According to a third aspect of the present disclosure, a non-transitory readable medium, storing a set of instructions for obtaining an instance segmentation or panoptic segmentation of an image based on semantic segmentation, wherein when the set of instructions is executed by a processor of an electrical device is disclosed. The device performs a method comprising: performing semantic segmentation on an input image to obtain semantic label map having specific set of classes, using a trained semantic segmentation model; generating a boundary map, using a trained generator, based on the obtained semantic label map concatenated with the input image; and processing the boundary map, using a post-processing step, to differentiate objects of the specific set of classes to obtain the instance segmentation or panoptic segmentation of the image, wherein the instance segmentation or panoptic segmentation is obtained in real time.

In some embodiments, the trained semantic segmentation model is DeepLabv3+ or dense prediction cell (DPC). In some embodiments, the trained generator comprises a conditional Generative Adversarial Networks (GANs) coupled with deep supervision as well as a weighted fusion layer. In some embodiments, the device is able to obtain instance segmentation or panoptic segmentation in real time. In some embodiments, the post-processing step comprises performing Breadth-First-Search for each enclosed area of the semantic label map to get a mask for each enclosed area, whose class is determined based on its semantic label map. In some embodiments, the set of instructions further instructs the processor to generate masks for at least one of thing classes and stuff classes. In some embodiments, the device further comprises a discriminator that engages in a minimax game with a generator to form the trained generator, wherein the discriminator distinguishes between a boundary map generated by the trained generator and a corresponding boundary map of ground truth.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of example embodiments. These example embodiments are described in detail with reference to the drawings. The drawings are not to scale. These embodiments are non-limiting example embodiments, in which like reference numerals represent similar structures throughout the several views of the drawings, and wherein.

DETAILED DESCRIPTION

Figure 1:
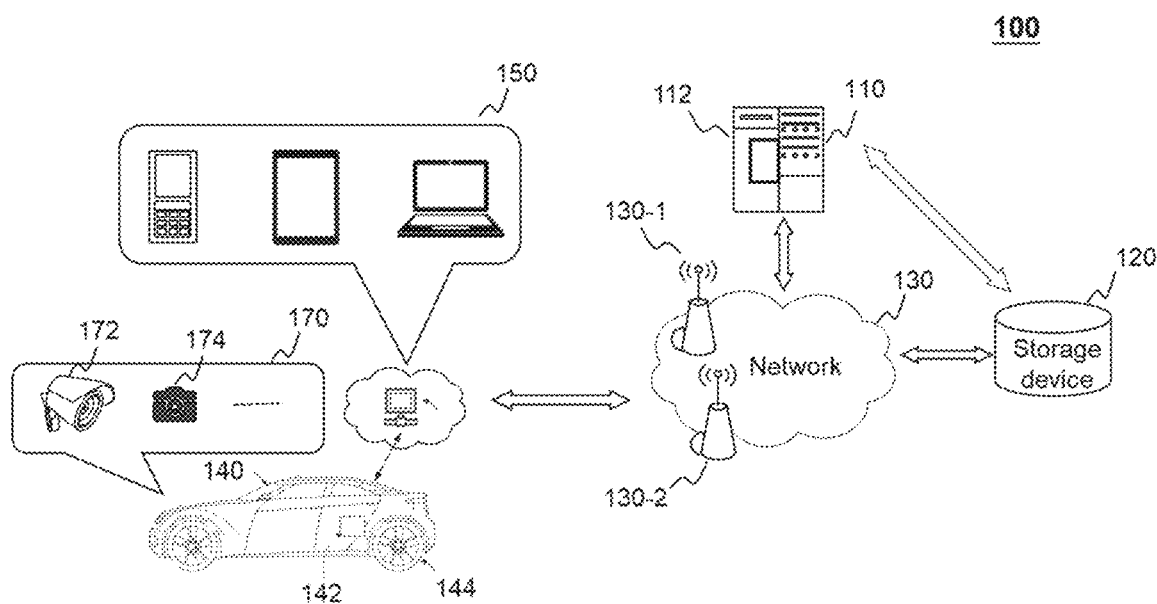
FIG. 1 is a schematic diagram illustrating the systems and methods disclosed herein integrated into an autonomous vehicle service system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes" and/or "including" when used in this disclosure, specify the presence of stated features, integers, steps, operations, elements, and/or components, but do not preclude the presence or addition of one or more other features, integers, steps, operations, elements, components, and/or groups thereof.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Embodiments of the present disclosure may be applied to different transportation systems including but not limited to land transportation, sea transportation, air transportation, space transportation, or the like, or any combination thereof. A vehicle of the transportation systems may include a rickshaw, travel tool, taxi, chauffeured car, hitch, bus, rail transportation (e.g., a train, a bullet train, high-speed rail, and subway), ship, airplane, spaceship, hot-air balloon, driverless vehicle, or the like, or any combination thereof. The transportation system may also include any transportation system that applies management and/or distribution, for example, a system for sending and/or receiving an express.

Some embodiments of the present disclosure relate to systems and methods for instance segmentation based on semantic segmentation. Compared to semantic segmentation, fine-grained instance segmentation is much more complicated and challenging. Most existing instance segmentation methods focus only on accuracy without paying much attention to inference latency, which, however, is critical to real-time applications such as autonomous driving. Disclosed herein are systems and methods that bridge the gap between semantic segmentation and instance segmentation by exploiting the complex correlations between them and effectively generating the corresponding instance segmentation from a semantic segmentation. Disclosed herein is a novel model, Sem2Ins, for real-time instance segmentation, which generates instances boundaries according to a semantic segmentation by leveraging conditional Generative Adversarial Networks (GANs) coupled with deep supervision as well as a weighted-fusion layer. The Sem2Ins is further validated by extensive experiments on the widely-used Cityscapes benchmark. Experimental results show that: 1) Sem2Ins is capable of processing HD images in real-time given semantic segmentation, e.g., it runs at over 25FPS for 2048×1024 images; 2) When being combined with a widely-used semantic segmentation method such as DPC, Sem2Ins delivers comparable performance with Mask R-CNN in terms of accuracy while consistently outperforms a state-of-the-art real-time solution; 3) Sem2Ins works flexibly with any semantic segmentation model to generate instance segmentation; 4) If the given semantic segmentation is sufficiently good, Sem2Ins even outperforms Mask R-CNN in terms of accuracy. 5) Sem2Ins are easily extended to pan-optic segmentation task.

Various embodiments of the present disclosure may be applied to an autonomous vehicle including an autonomous pilot system. The autonomous pilot system may be used to control the autonomous driving of the vehicle. An arithmetic and control unit (ACU) of the autonomous vehicle may receive and process real time sensor data such as image data from a camera system of the autonomous vehicle. The image data is processed by the systems and methods disclosed herein in real time to generate one or more real time vehicle control (VC) commands. The one or more real time VC commands may include but not limited to acceleration, deceleration, making a turn, switching lanes, or the like, or any combination thereof. It should be understood that application scenarios of the system and method disclosed herein are only some examples or embodiments. Those having ordinary skills in the art, without further creative efforts, may apply these drawings to other application scenarios, for example, another similar transportation system.

FIG. 1 is a schematic diagram illustrating an autonomous vehicle service system according to some embodiments of the present disclosure. In some embodiments, autonomous vehicle service system 100 may be an Internet of Things (IoT) platform including a server 110, a storage device 120, a network 130, an autonomous vehicle 140. The server 110 may further include a processing device 112.

In some embodiments, the server 110 may be a single server, or a server group. The server group may be centralized, or distributed (e.g., the server 110 may be a distributed system). In some embodiments, the server 110 may be local or remote. For example, the server 110 may access at least one of information and data stored in at least one of the autonomous vehicle 140, and the storage device 120 via the network 130. As another example, the server 110 may be directly connected to at least one of the autonomous vehicle 140, and the storage device 120 to access stored at least one of information and data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the server 110 may include a processing device 112. The processing device 112 may process at least one of information and data from the autonomous vehicle(s) 140. For example, the processing device 112 may receive a service request from a user (e.g., a driver or a passenger). In some embodiments, the service request may include at least one of a pick-up location and a drop-off location. The processing device 112 may provide one or more routes from the pick-up location to the drop-off location. The processing device 112 may send the one or more routes to the autonomous device 140 via the network 130. In some embodiments, the service request may include entertainment needs (e.g., music needs, radio needs, movie needs, reading needs, etc.) from the user, the processing device 112 may provide sources to satisfy the entertainment needs of the user in response to the service request. In some embodiments, the service request may include one or more commands to operate the autonomous vehicle 140, for example, parking, slowing down, accelerating, controlling in-car temperature, etc. The processing device 112 may remotely operate the autonomous vehicle 140 via a built-in autonomous pilot system in response to the one or more commands. In some embodiments, the processing device 112 may include one or more processing engines (e.g., a single-core processor or a multi-core processor). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The storage device 120 may at least one of store data and instructions. In some embodiments, the storage device 120 may store data obtained from the autonomous vehicle 140. In some embodiments, the storage device 120 may store at least one of data and instructions that the server 110 may execute or use to perform example methods described in the present disclosure. In some embodiments, the storage device 120 may include a mass storage, a removable storage, a volatile read-and-write memory, a read-only memory (ROM), or the like, or any combination thereof. Example mass storage may include a magnetic disk, an optical disk, a solid-state drive, etc. Example removable storage may include a flash drive, a floppy disk, an optical disk, a memory card, a zip disk, a magnetic tape, etc. Example volatile read-and-write memory may include a random access memory (RAM). Example RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Example ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 120 may be connected to the network 130 to communicate with one or more components of the autonomous vehicle service system 100 (e.g., the server 110, the autonomous vehicle 140). One or more components in the autonomous vehicle service system 100 may access the data or instructions stored in the storage device 120 via the network 130. In some embodiments, the storage device 120 may be directly connected to or communicate with one or more components in the autonomous vehicle service system 100 (e.g., the server 110, the autonomous vehicle 140). In some embodiments, the storage device 120 may be part of the server 110.

The network 130 may facilitate exchange of at least one of information and data. In some embodiments, one or more components in the autonomous vehicle service system 100 (e.g., the server 110, the storage device 120, and the autonomous vehicle 140) may send at least one of information and data to other component(s) in the autonomous vehicle service system 100 via the network 130. For example, the server 110 may obtain/acquire vehicle at least one of information and environment information around the vehicle via the network 130. In some embodiments, the network 130 may be any type of wired or wireless network, or combination thereof. Merely by way of example, the network 130 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 130 may include one or more network access points. For example, the network 130 may include wired or wireless network access points such as at least one of base stations and internet exchange points 130-1, 130-2, . . . , through which one or more components of the autonomous vehicle service system 100 may be connected to the network 130 to exchange at least one of data and information.

In some embodiments, the autonomous vehicle 140 may include structures of a conventional vehicle, for example, a chassis, a suspension, steering, a braking, drivetrain components, an engine, and so on. In some embodiments, the autonomous vehicle 140 may include vehicles having various autonomous driving levels, such as, level 0 (i.e., No Automation, at level 0, the driver performs all operating tasks like steering, braking, accelerating or slowing down, and so forth), level 1 (i.e., Driver Assistance, at level 1, the vehicle can assist with some functions, but the driver still handles all accelerating, braking, and monitoring of the surrounding environment), level 2 (i.e., Partial Automation, at level 2, the vehicle can assist with steering or acceleration functions and allow the driver to disengage from some of their tasks, but the driver must always be ready to take control of the vehicle and is still responsible for most safety-critical functions and all monitoring of the environment), level 3 (i.e., Conditional Automation, at level 3, the vehicle itself controls all monitoring of the environment, and the driver's attention is still critical at this level, but can disengage from "safety critical" functions like braking and leave it to the technology when conditions are safe), level 4 (i.e., High Automation, at level 4, the vehicle is capable of steering, braking, accelerating, monitoring the vehicle and roadway as well as responding to events, determining when to change lanes, turn, and use signals. However, the automatic pilot system would first notify the driver when conditions are safe, and only then does the driver switch the vehicle into the auto pilot mode), or level 5 (e.g., Complete Automation, at level 5, this level of autonomous driving requires absolutely no human attention. There is no need for pedals, brakes, or a steering wheel, as the automatic pilot system controls all critical tasks, monitoring of the environment and identification of unique driving conditions like traffic jams).

In some embodiments, the autonomous vehicle 140 may be configured with one or more sensors such as a camera to detect at least one of internal information and external information surrounding the vehicle. For example, the external information may include environment information surrounding the vehicle, such as weather information, road condition information, traffic light information, obstacle information, pedestrian information, and so on. The internal information may include user pose information, user interaction information, and so on. In some embodiments, the autonomous vehicle 140 may be configured with a computing device 150 for controlling the autonomous vehicle in real time or near real time according to at least one of the internal information and external information. As used herein, the computing device 150 may refer to an arithmetic and control unit (ACU). The ACU 150 may be various in forms. For example, the ACU 150 may include a mobile device, a tablet computer, a physical display screen (e.g., an LCD, an electronic ink display (E-Ink), curved screen, a television device, a touch screen, etc.), or the like, or any combination thereof. In some embodiments, the mobile device may include, a wearable device, a mobile device, a virtual reality device, an augmented reality device, or the like, or any combination thereof. In some embodiments, the wearable device may include a bracelet, footgear, eyeglasses, a helmet, a watch, clothing, a backpack, a smart accessory, or the like, or any combination thereof. In some embodiments, the mobile device may include a mobile phone, a personal digital assistance (PDA), a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc.

In some embodiments, the ACU may be configured with an autonomous pilot system for controlling the autonomous vehicle. The ACU may include a multi-core processor for processing one or more tasks from the autonomous pilot system. In some embodiments, at least one dedicated processing core of the ACU may be dedicated to process one or more real time vehicle controlling (VC) tasks to generate one or more real time VC commands according to the real time sensor data. In some embodiments, at least one of the real time VC commands and the non-real time VC commands may be transmitted to a vehicle controlling unit (VCU) for operating the vehicle. The VCU may include one or more controllers of the autonomous vehicle, for example, one or more throttle controllers, one or more spark controllers, one or more brake controllers, one or more steering controllers, an exhaust gas recycling (EGR) controller, a waste gate controller, and so on.

It should be noted that the descriptions above in relation to the ACU 150 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. In some embodiments, the ACU 150 may include one or more other subunits. For example, the ACU 150 may include a storage subunit to store data generated by the subunits in the ACU 150. In some embodiments, any two of the subunits may be combined as a single unit.

In some embodiments, the autonomous vehicle 140 may communicate with one or more components of the autonomous vehicle service system 100 (e.g., the server 110, the storage device 120) via the network 130. In some embodiments, the autonomous vehicle 140 may communicate with other vehicles (not shown in FIG. 1) around the vehicle itself. For example, a first vehicle may obtain at least one of distance information and speed information regarding a second vehicle. When the second vehicle is so close to the first vehicle (e.g., a distance between two vehicles is less than or equal to a distance threshold), the first vehicle may send an alert information to the second vehicle, which may avoid a potential vehicle accident.

In some embodiments, the autonomous vehicle 140 may be an electric vehicle, a fuel cell vehicle, a hybrid vehicle, or a conventional internal combustion engine vehicle. The autonomous vehicle 140 may include a body 142 and at least one wheel 144. The body 142 may include various body styles, such as a sports vehicle, a coupe, a sedan, a pick-up truck, a station wagon, a sports utility vehicle (SUV), a minivan, or a conversion van. In some embodiments, the autonomous vehicle 140 may include a pair of front wheels and a pair of rear wheels, as illustrated in FIG. 1. In some embodiments, the autonomous vehicle 140 may have more or less wheels or equivalent structures that enable vehicle 140 to move around. The autonomous vehicle 140 may be configured to be all wheel drive (AWD), front wheel drive (FWR), or rear wheel drive (RWD). In some embodiments, the autonomous vehicle 140 may be configured to be operated by at least one of an operator occupying the vehicle, remotely controlled, and autonomously controlled.

As described in connection with FIG. 1, the autonomous vehicle 140 may be equipped with an automatic pilot system configured to control the autonomous vehicle 140. The automatic pilot system may be implemented by an arithmetic and control unit (ACU). The autonomous pilot system may be configured to operate the vehicle automatically. In some embodiments, the autonomous pilot system may obtain at least one of data and information from one or more sensors of the vehicle. In some embodiments, the autonomous pilot system may be categorized to three layers, that is, perception, planning, and control. The autonomous pilot system may perform one or more operations regarding at least one of the perception, the planning and the control. For example, in the perception layer, the autonomous pilot system may perform at least one of environment perception and localization based on the sensor data, such as weather detection, in-car temperature detection, lane detection, free drivable area detection, pedestrian detection, obstacle detection, traffic sign detection, and so on. As another example, in the planning layer, the autonomous pilot system may perform at least one of a mission planning, a behavior planning, and a motion planning according to at least one of the environment perception and localization. As a further example, in the control layer, the autonomous pilot system may generate one or more real time VC commands according to results of the perception layer and the planning layer. Specifically, the autonomous pilot system may generate the one or more real time VC commands based on at least one of feedback control and model predictive control. More descriptions regarding the embodiments with respect to the perception layer, the planning layer, and the control layer may be found in, e.g., an article "Pendleton, Scott Drew, et al. "Perception, planning, control, and coordination for autonomous vehicles." *Machines* 5.1 (2017): 6", the contents of which are hereby incorporated by reference.

The autonomous vehicle 140 may include one or more sensors to provide information that is used to operate the vehicle automatically. The one or more sensors such as one or more cameras may detect at least one of internal information and external information regarding the autonomous vehicle 140 in real time or near real time. For example, the external information may include environment information around the vehicle, such as weather information, road condition information, traffic light information, obstacle information, pedestrian information, and so on. The internal information may include user pose information, user interaction information, and so on. It is understood that the one or more sensors may also include various types of sensors, such as visual-sensing systems, laser-sensing systems, infrared-sensing systems, acoustic-sensing systems, thermal-sensing systems, or the like, or any combination thereof.

In some embodiments, the autonomous vehicle 140 may at least be configured with a positioning system. The positioning system may provide navigation information for the autonomous vehicle 140. The navigation information may include a current location of the vehicle, a destination of the vehicle, a velocity, an acceleration, a current time, or the like, or any combination thereof. The location may be in the form of coordinates, such as a latitude coordinate and a longitude coordinate. The positioning system may include but not limited to a compass navigation system (COMPASS), a global positioning system (GPS), a BeiDou navigation satellite system, a Galileo positioning system, a quasi-zenith satellite system (QZSS), and so on.

In some embodiments, the visual-sensing system comprises a video or image capture system or image source 170 including cameras 172 and 174 configured to acquire a video composed of a plurality of images (also referred to as "video frames") or still images.

The camera 172 or 174 may be able to capture one or more images. As used in this application, an image may be a still image, a video, a stream video, or a video frame obtained from a video. In some embodiments, the camera 172 or 174 may be a digital camera, a video camera, a security camera, a web camera, a smartphone, a tablet, a laptop, a video gaming console equipped with a web camera, a camera with multiple lenses, etc.

The camera 172 or 174 may include a lens, a shutter, a sensor, a processing device, and a storage device. The lens may be an optical device that focuses a light beam by means of refraction to form an image. In some embodiments, the lens may include one or more lenses. The lens may be configured to intake a scene. An aperture of the lens may refer to the size of the hole through which light passes to reach the sensor. The aperture may be adjustable to adjust the amount of light that passes through the lens. The focal length of the lens may be adjustable to adjust the coverage of the camera.

The shutter may be opened to allow light through the lens when an image is captured. The shutter may be controlled manually or automatically by the processing device.

The sensor may be configured to receive light passing through the lens and transform the light signals of the received light into electrical signals. The sensor may include charge coupled device (CCD) and complementary metal-oxide semiconductor (CMOS). The sensor may be in communication with the logic circuits and may be configured to detect the scene from the lens and transform the scene into electronic signals.

A "video" provided by the video or image capture system or image source 170 may include a plurality of frames, which may also be referred to as video frames. A frame may be one of a plurality of still images that compose a completer video. And the frames of a video are captured in a rate called frame rate, such as 24 frames per second (fps), 30 fps, 60 fps, etc.

The video frames to be transmitted may be stored in a buffer in the ACU 150 in a form of a video frame buffering queue, which may be managed by a buffer manager. The buffer may use a queue based data structure for buffering the video to be transmitted.

The buffer may be a storage device for buffering the video to be transmitted. The buffer may include a mass storage device, a removable storage device, a volatile read-and-write memory, a read-only memory (ROM), or the like, or any combination thereof. Example mass storage may include a magnetic disk, an optical disk, a solid-state drive, etc. Example removable storage may include a flash drive, a floppy disk, an optical disk, a memory card, a zip disk, a magnetic tape, etc. Example volatile read-and-write memory may include a random-access memory (RAM), such as a dynamic RAM (DRAM), a double date rate synchronous dynamic RAM (DDR SDRAM), a static RAM (SRAM), a thyristor RAM (T-RAM), and a zero-capacitor RAM (Z-RAM). Example ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

Figure 2:
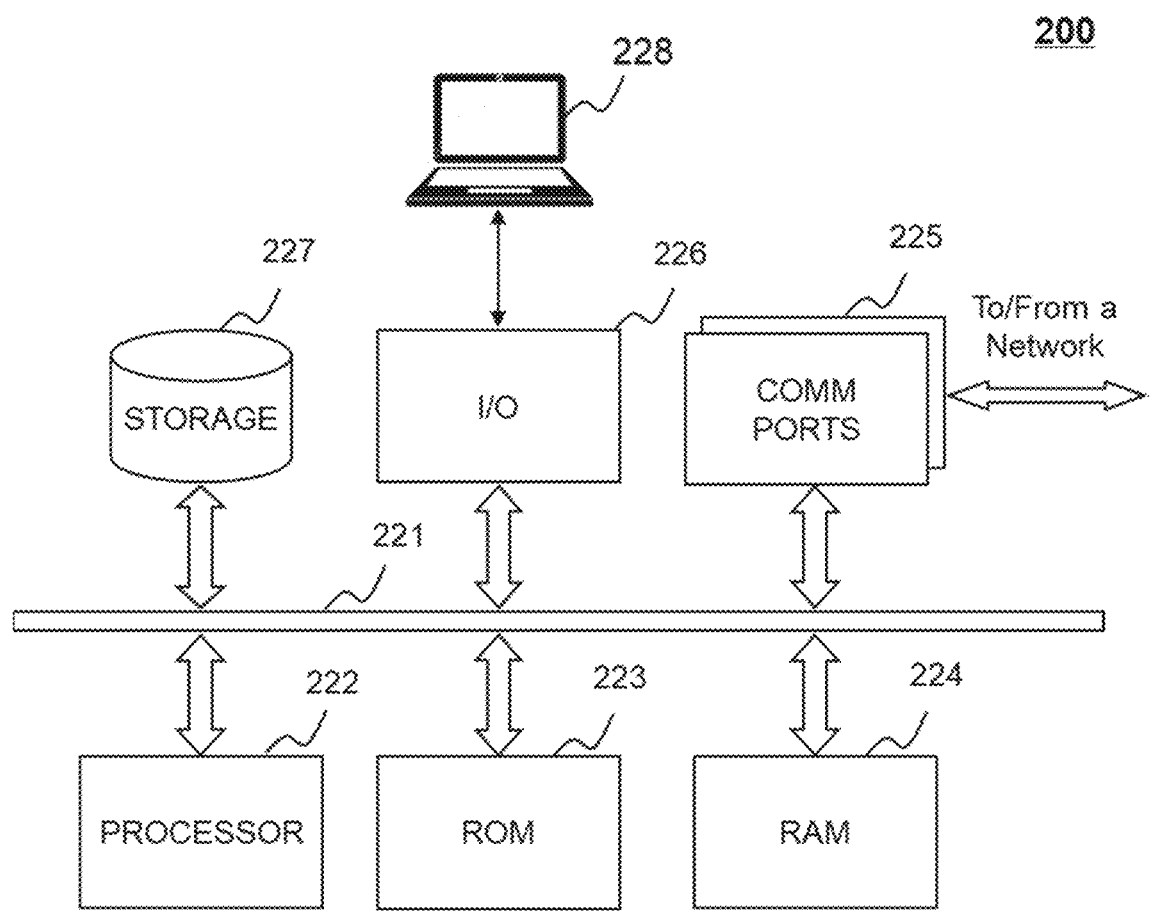
FIG. 2 is a schematic diagram illustrating components of a computing device according to some embodiments of the present disclosure.

FIG. 2 is a schematic diagram illustrating example hardware and/or software components of an example 200 of the computing device 150 according to some embodiments of the present disclosure. For example, the computing device 200 may be the display control device or a part of it. As illustrated in FIG. 2, the computing device 200 may include a processor 222, a storage 227, an input/output (I/O) 226, and a communication port 225.

The processor 222 (e.g., logic circuits) may execute computer instructions (e.g., program code) and perform functions in accordance with techniques described herein. For example, the processor 222 may include interface circuits and processing circuits therein. The interface circuits may be configured to receive electronic signals from a bus 221, wherein the electronic signals encode structured data and/or instructions for the processing circuits to process. The processing circuits may conduct logical operations calculations, and then determine a conclusion, a result, and/or an instruction encoded as electronic signals. Then the interface circuits may send out the electronic signals from the processing circuits via the bus 221.

The computer instructions may include, for example, routines, programs, objects, components, data structures, procedures, modules, and functions, which perform particular functions described herein. In some embodiments, the processor 222 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 227 may store data/information obtained from the image source 170, and/or the ACU 160. In some embodiments, the storage 222 may include a mass storage, removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random-access memory (RAM), which may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 222 may store one or more programs and/or instructions to perform example methods described in the present disclosure. For example, the storage 222 may store a program for the processing engine (e.g., the server 103) for determining a regularization item.

The I/O 226 may input and/or output signals, data, information, etc. In some embodiments, the I/O 226 may include one or more input ports and one or more output ports. The one or more input ports (also referred to as data acquisition port) may be configured to acquire data/information, such as a channel of video signal.

The communication port 225 may be connected to a network to facilitate data communications. The communication port 225 may establish connections between the image source 170 and/or the ACU 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or a combination thereof. In some embodiments, the communication port 225 may be and/or include a standardized communication port, such as RS232, RS485, etc. In some embodiments, the communication port 225 may be a specially designed communication port.

Figure 3:
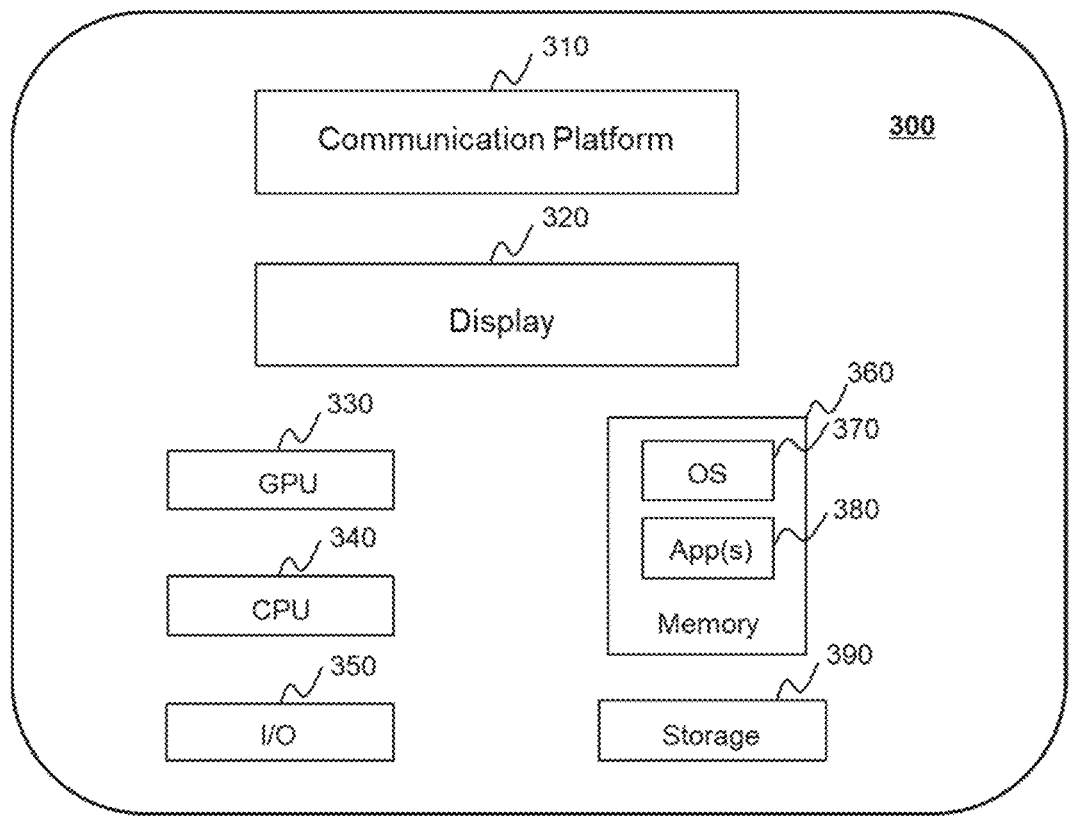
FIG. 3 is a schematic diagram illustrating hardware and/or software components of an example of the ACU of FIG. 1 according to some embodiments of the present disclosure.

FIG. 3 is a schematic diagram illustrating hardware and/or software components of an example 300 of the ACU 150 according to some embodiments of the present disclosure. As illustrated in FIG. 3, the ACU example 300 includes a communication platform 310, a display 320, a graphics processing unit (GPU) 330, a central processing unit (CPU) 340, an I/O 350, a memory 360, a mobile operating system (OS) 370, and storage 390. In some embodiments, any other suitable component, including but not limited to a system bus or a controller (not shown), may also be included in the ACU 300.

In some embodiments, the operating system 370 and one or more applications 380 may be loaded into the memory 360 from the storage 390 in order to be executed by the CPU 340. The applications 380 may include a browser or any other suitable application for receiving and rendering information relating to positioning or other information from the processing device 112. User interactions with the information stream may be achieved via the I/O 350 and provided to the processing device 112 and/or other components of the autonomous driving system 100 via the network 130.

To implement various modules, units, and their functionalities described in the present disclosure, computer hardware platforms may be used as the hardware platform(s) for one or more of the elements described herein. A computer with user interface elements may be used to implement a personal computer (PC) or any other type of workstation or terminal device. A computer may also act as a server if appropriately programmed.

The systems and methods disclosed herein aim to tackle instance segmentation from a new perspective by viewing it as an extended task of its coarse-grained counterpart, semantic segmentation. Compared to semantic segmentation, fine-grained instance segmentation is much more complicated and challenging since there is a large gap between them. In order to obtain the corresponding instance segmentation from a semantic segmentation, instances within the area of a common semantic mask need to be differentiated.

Figure 5:
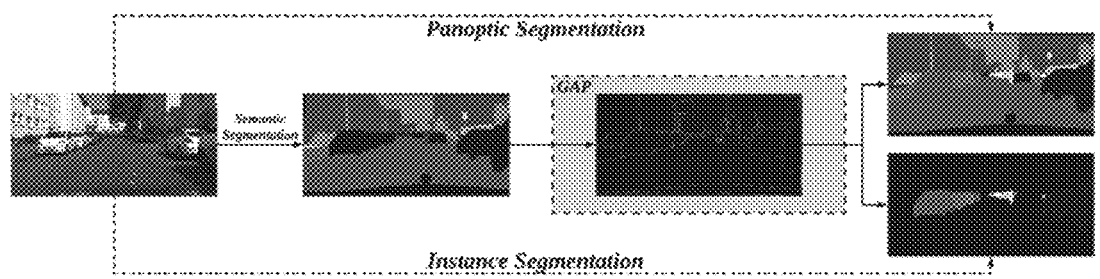
FIG. 5 is a schematic diagram illustrating Sem2Ins model used for generating a corresponding instance segmentation and panoptic segmentation from semantic segmentation, according to some embodiments of the present disclosure.

The systems and methods disclosed herein bridge the gap between semantic segmentation and instance segmentation by exploiting the complex correlations between them and generating boundaries among instances to separate instances with a common semantic mask. Specifically, a new model, named Sem2Ins, produces a corresponding instance segmentation or panoptic segmentation from a semantic segmentation, as illustrated by FIG. 5. Sem2Ins leverages a light-weight generator based on conditional Generative Adversarial Networks (cGANs) such as those disclosed by Mirza and Osindero (2014. Conditional generative adversarial nets. *arXiv preprint arXiv:* 1411.1784) coupled with the least squares loss such as those disclosed by Mao et al. (2017. Least squares generative adversarial networks. In *Proceedings of the IEEE ICCV,* 2794-2802) for generating instance boundaries, which is further enhanced by deep supervision such as those disclosed by Lee et al. (2015. Deeply-supervised nets. In *Artificial Intelligence and Statistics,* 562-570) as well as a weighted-fusion layer. Extensive experiments performed on the widely-used Cityscapes benchmark, have shown that Sem2Ins is a fast, effective and flexible model. First, Sem2Ins introduces a minor computational overhead and inference latency such that it is capable of processing HD images in real-time given semantic segmentation, e.g., it runs at over 25FPS for 2048×1024 images. Second, when being combined with a widely-used semantic segmentation method such as DPC, Sem2Ins delivers comparable performance with Mask R-CNN in terms of accuracy while consistently outperforms a state-of-the-art real-time solution such as those disclosed by Uhrig et al. (2018. Box2pix: Single-shot instance segmentation by assigning pixels to object boxes. In 2018 *IEEE Intelligent Vehicles Symposium (IV),* 292-299. IEEE). Moreover, Sem2Ins works flexibly with any semantic segmentation model to generate the instance segmentation. In addition, Sem2Ins shows a great potential for generating accurate instance segmentation since if the given semantic segmentation is sufficiently good, Sem2Ins outperforms Mask R-CNN in terms of accuracy. Finally, Sem2Ins can be easily extended to panoptic segmentation task.

Representative semantic segmentation methods that could be used to conduct Sem2Ins model include PSPNet such as those disclosed by Zhao et al. (2017. Pyramid scene parsing network. In *Proceedings of the IEEE CVPR,* 2881-2890) is designed for pixel-level prediction on scene parsing, which exploits the capability of global context information by different region-based context aggregation; AdaptNet++ such as those disclosed by Valada, Mohan, and Burgard (2018. Self-supervised model adaptation for multimodal semantic segmentation. *arXiv preprint arXiv:* 1808.03833), which uses a computationally efficient unimodal segmentation architecture called AdaptNet++ that incorporates an encoder with multi-scale residual units; DeepLabv3+ such as those disclosed by Chen et al. (2018b. Encoder-decoder with atrous separable convolution for semantic image segmentation. In *Proceedings of the ECCV,* 801-818), by adding an effective decoder on DeepLabv3 to refine the segmentation results, especially object boundaries. Dense Prediction Cell (DPC) such as those disclosed by Chen et al. (2018a. Searching for efficient multi-scale architectures for dense image prediction. In *NIPS,* 8699-8710) built a recursive search space to encode multi-scale context information for dense prediction.

Most recent works on instance segmentation can be categorized into one of three routes. The most popular route of instance segmentation is proposal-based, which determines proposals first followed by a classification step. A well-known work called Mask R-CNN, extends Faster R-CNN by adding a branch for mask prediction. Another route of works generates instances sequentially based on recurrent networks, for example, an end-to-end recurrent network with convolutional LSTMs to sequentially output instances. Last route of instance segmentation focuses on transforming the image into an appropriate representation which is clustered into instances through post-processing. All the instant segmentation works listed above take image as input. The systems and methods disclosed herein however, chooses a completely different way, which starts from semantic segmentation.

Both semantic segmentation and instance segmentation aim at understanding images at the pixel level. However, the former focuses on amorphous regions of un-countable objects which share similar texture or materials i.e., stuff classes, whereas the latter focuses on segmenting countable objects, i.e., thing classes. Panoptic segmentation, a unified view of image segmentation integrates semantic segmentation (per-pixel class label) and instance segmentation (per-object mask and class label) into a unified task, to define a simple but general output format, which encompasses both thing classes e.g., person, car and stuff classes e.g., road, sky. Instance segmentation and panoptic segmentation have not been tackled based on semantic segmentation.

Figure 4:
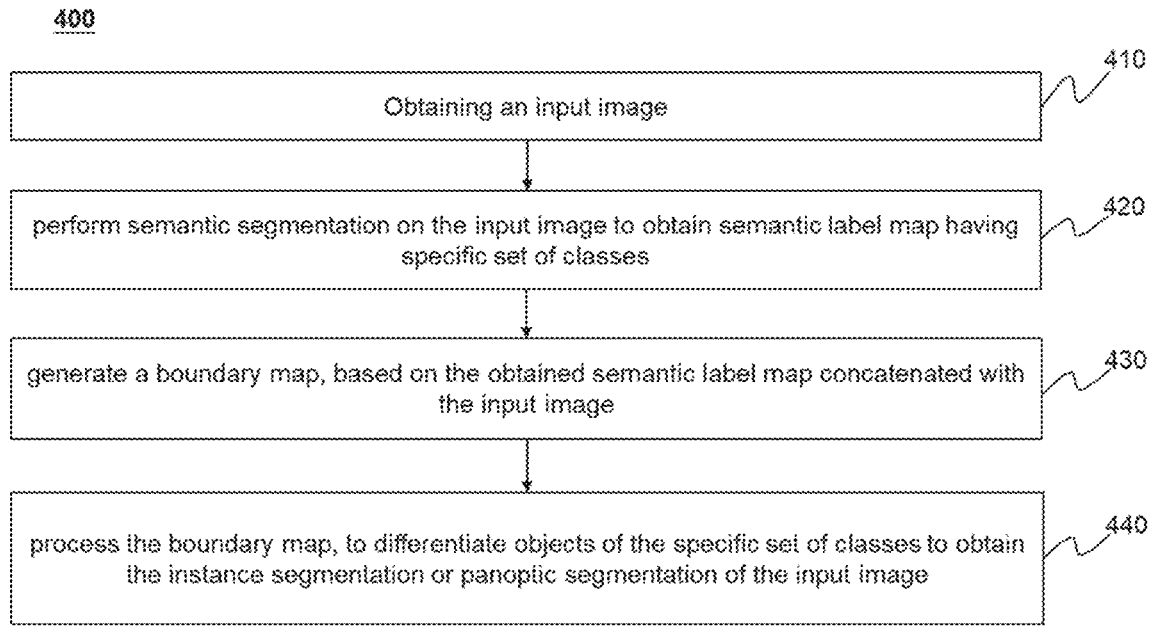
FIG. 4 is a flow chart illustrating the instance segmentation based on semantic segmentation processes according to some embodiments of the present disclosure.

FIG. 4 provides a flow chart illustrating the instance segmentation to semantic segmentation process 400 according to some embodiments of the present disclosure. Specifically, when an input image is first obtained at step 410, Sem2Ins differentiates all the objects belonging to a specific set of classes based on its semantic segmentation. In order to achieve this goal, Sem2Ins is separated into three steps: semantic segmentation at 420, boundary map generation at 430, and post-processing at 440. To perform semantic segmentation on an input image to obtain semantic label map having specific set of classes, a trained semantic segmentation model is used. To generate a boundary map, based on the obtained semantic label map concatenated with the input image, a trained generator is used. To process the boundary map, to differentiate objects of the specific set of classes to obtain the instance segmentation or panoptic segmentation of the input image, a post-processing step is used.

At least one of the process and method 400 may be executed by at least one computing device in an autonomous vehicle (e.g., the ACU 150 or the computing device 200). For example, at least one of the process and method 400 may be implemented as a set of instructions (e.g., an application) stored in a non-transitory computer readable storage medium (e.g., the storage device 227). At least one processor of the computing device (e.g., the processor 222 of the computing device 200) may execute the set of instructions and may accordingly be directed to perform at least one of the process and method 400 via at least one of receiving and sending electronic signals.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

At the beginning step, a trained semantic segmentation model, e.g., DeepLabv3+, is used to obtain the semantic segmentation of an input image. Then the boundary map is generated through a trained generator with the obtained semantic segmentation as well as input image as input. Finally, in the post-processing step, objects of the specific set of classes are differentiated by processing the boundary map. For panoptic segmentation, masks of both thing classes and stuff classes are generated. For instance segmentation, masks of only thing classes are generated.

Figure 6:
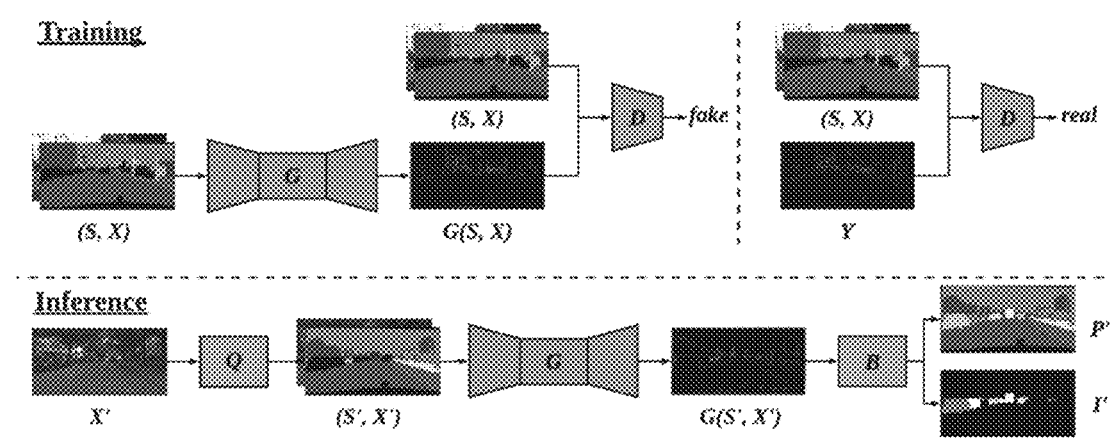
FIG. 6 is a schematic diagram illustrating training and inference of Sem2Ins, according to some embodiments of the present disclosure.

The Training and Inference setups of Sem2Ins are shown in FIG. 6. As shown in FIG. 6, for Training, the system learns a mapping G: (S;X) G (S;X) with discriminator D which attempts to distinguish between "real" image pair ((S;X); Y) and "fake" image pair ((S;X);G (S;X)). For Inference: a trained semantic segmentation model Q: X'S' is used to obtain semantic label map, which is concatenated with input image and passed into the trained mapping G for boundary map generation. Instance segmentation I' and panoptic segmentation P' are generated through a post-processing step B.

Given an image X from training set, its ground truth semantic label map S and ground truth boundary map Y is computed based on its instance label map. Note that both of semantic label map and instance label map used here contains the ground truth labels of thing classes and stuff classes. During training, a generator G learns to generate boundary map G (S, X) with (S, X) as input, and (S, X) represents the concatenation of ground truth semantic label map and training image. Discriminator D attempts to distinguish between the "real" image pair ((S, X), Y) and the "fake" image pair ((S, X), G (S, X)). Through adversarial training, the generated boundary map G (S, X) is optimized to resemble the ground truth boundary map Y.

For Inference process illustrated in FIG. 6, in contrast to training, the semantic label map S' of a testing image X' can only be obtained through a trained semantic segmentation model Q. Similar to training, the semantic label map S' and the testing image X' are concatenated and passed into the trained generator G to generate boundary map G (S', X'). The instance segmentation I' and panoptic segmentation P' can be generated by processing the generated boundary map G (S', X') in step B, where Breadth-First-Search is performed for each enclosed area to get a mask, whose class is determined based on its semantic label map S'. Note that the time complexity of post-processing is O (|B|), where |B| denotes the number of pixels in the generated boundary map and can be ignored, especially when |B| is small due to small image size. Algorithm of step B is shown in Tables 1 and 2 below.

TABLE 1

Post-Processing Algorithm for Instance/Panoptic Segmentation

Input: B, h and w: The generated boundary map with height h and width w; values of B belong to {0,1}, 1 denotes boundary.
Input: S; The generated semantic label map. Values of S are not equal to 0.
Input: C: The set of classes to be differentiated. For instance segmentation, C is the set of thing classes. For panoptic segmentation, C is the set of both thing classes (i.e., $C_{Th}$) and stuff classes (i.e., $C_{St}$).

TABLE 1-continued

Post-Processing Algorithm for Instance/Panoptic Segmentation

Output:R: The result of instance segmentation of panoptic segmentation.
Output: N: The numer of instances belonging to $C_{Th}$.
1. Initialize R to all zeros with height h and width w;
2: Initialize N to zero;
3: for x = 0, x < h; x = x + 1 do
4:   for y = 0; y < w; y = y + 1 do
5:      if R (x,y) = 0 && B(x,y) ≠ 1 && S(x,y) ∈ C then
6:         if S(x,y) ∈ $C_{Th}$ then
7:            $class_{id}$ = S(x,y);
8:            N = N + 1;
9:            L = N;
10:        end if
11:        if S(x,y) ∈ $C_{St}$ then
12:            $class_{id}$ = S(x,y).
13:            L = S(x,y;)
14:        end if
15:        R = BFS(B, x,y,R,L,S, $class_{id}$);
16:      end if
17:   end for
18: end for

TABLE 2

Algorithm for Breadth-First-Search (BFS) on Boundary Map (clarifies the BFS in Line 15 of the Algorithm of Table 1)

Input B: B: The generated boundry map.
Input: x and y: The starting point of BFS.
Input: L. The number of currently differentiated instances for $C_{Th}$. The class id for $C_{St}$. L ≠ 0.
Input: S: The generated semantic label map.
Input: class $_{id}$: The class id of the enclosed area.
Input & Output: R: The result of instance segmentation or panoptic segmentation.
1: Initialize a direction list D = {(0,−1),(0,1),(−1,0),(1,0)} corresponding to four directions: left ,right, up and down;
2: Initialize an empty queue Q:
3: Q = Enqueue((x,y));
4: R(x,y) = L;
5: while Q is not empty do
6:   ($x_{cur}$, $y_{cur}$) = Dequeue(Q);
7:   for i = 0: i < 4; i = i + 1 do
8:      ($x_{tmp}$,$y_{tmp}$) = ($x_{cur}$,$y_{cur}$) + D[i];
9:      if R($x_{tmp}$,$y_{tmp}$) = 0 && B($x_{tmp}$, $y_{tmp}$) ≠ 1 && S($x_{tmp}$, $y_{tmp}$) = $class_{id}$ then
10:        Q = Enqueue (($x_{tmp}$, $y_{tmp}$)):
11:        R($x_{tmp}$, $y_{tmp}$) = L:
12:      end if
13:   end for
14: end while Sem2Ins is based on a cGANs for translation of semantic segmentation to boundary map, which consists of a generator G and a discriminator D engaging in a minimax game. The generator's task is to generate boundary map to deceive the discriminator, while the discriminator focuses on distinguishing between the "fake" boundary map generated by generator and the corresponding "real" one of ground truth. The objective function of Sem2Ins takes the form $$\min_G((\max_{D_1,D_2,D_3} \sum_{k=1,2,3} \mathcal{L}_{GAN}(G_f(S, X), D_k)) + \quad (1)$$

$$\lambda_{FM} \sum_{k=1,2,3} \mathcal{L}_{FM}(G_f(S, X), D_k) +$$

$$\lambda_{side} \sum_{k=1,2,3,4} \mathcal{L}_{side}(G_{side}^n(S, X), Y))$$

Where $L_{GAN}$ (G, D) is the adversarial loss:

$$L_{GAN}(G,D) = E_{((S,X),Y)}[\log D(S,X),Y)] + E_{(S,X)}[\log(1 - D((S,X),G(S,X)))] \quad (2)$$

where (S, X) serves as the input to generator for boundary map generation, and acts as the reference to help discriminator distinguish between the generated boundary map G (S, X) and the ground truth Y. $L_{FM}$ is the feature matching loss proposed by pix2pixHD such as those disclosed by Wang et al. (2018. High-resolution image synthesis and semantic manipulation with conditional gains. In *Proceedings of the IEEE CVPR*, 8798-8807) for training process stabilization. Multi-scale discriminators D=($D_1$, $D_2$, . . . , $D_k$) presented in pix2pixHD is targeting at improving the capability of discriminator in differentiating real and synthesized images with high-resolution. In our implementation, three-scale discriminators (i.e., D=$D_1$, $D_2$, $D_3$)) with identical network structure are implemented according to the PatchGAN architecture such as those disclosed by Isola et al. (2017. Image-to-image translation with conditional adversarial networks. In *Proceedings of the IEEE CVPR*, 1125-1134). $G_{side}^n$ (S, X) represents the output of the nth side-output layer and Gr (S, X), the output of weighted-fusion layer, represents the generated boundary map, both of which as well as $L_{side}^{\square}$, the class-balanced cross-entropy loss function for each side output-layer as further defined below.

Figure 7:
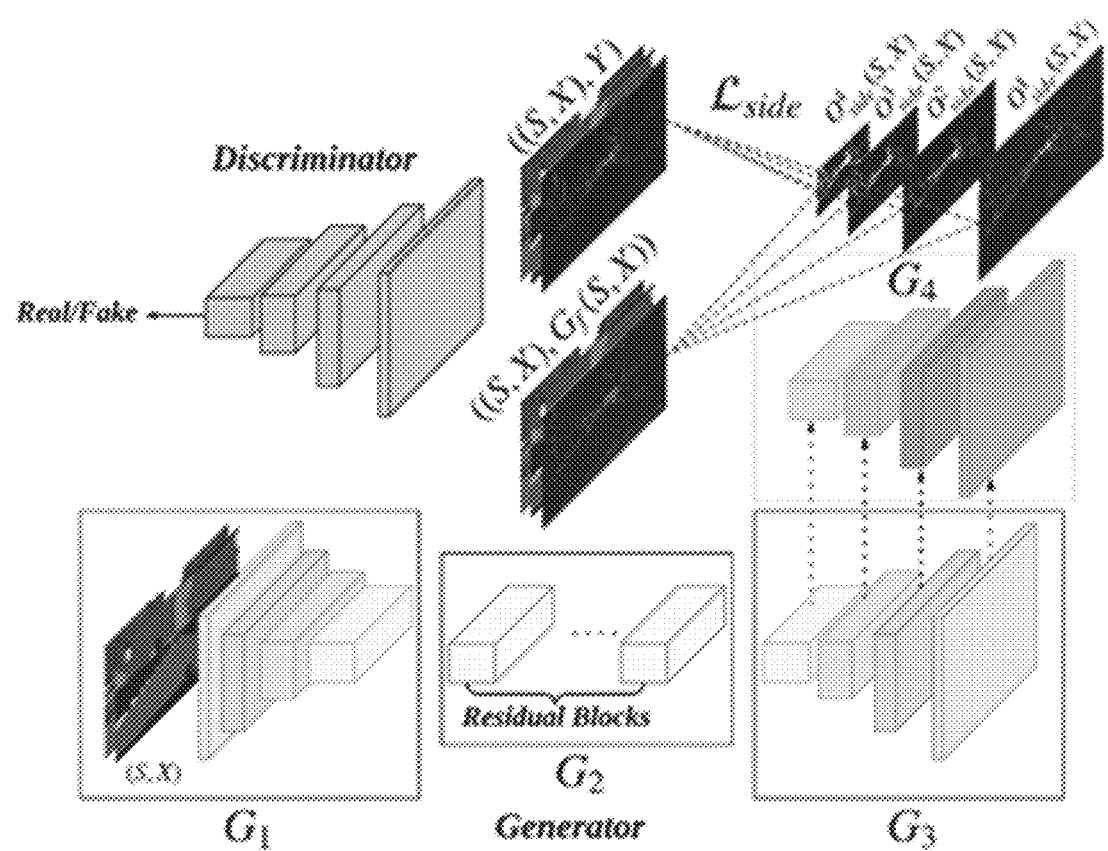
FIG. 7 is schematic diagram illustrating model architecture of Sem2Ins according to some embodiments of the present disclosure.

As shown in FIG. 7, the generator consists of 4 components: a convolutional front-end $G_1$, a set of residual blocks $G_2$, a transposed convolutional back-end $G_3$ and a set of side-output layers $G_4$, $G_1$, $G_2$, and $G_3$ combined together form a basic generator such as those disclosed by Johnson, Alahi, and Fei-Fei (2016. Perceptual losses for real-time style transfer and super-resolution. In *ECCV*, 694-711. Springer). However, based only on the basic generator, the experimental results disclosed below prove that the generated boundary maps are not good enough for instance segmentation, which is believed as the bad effect caused by the shortage of supervision for global information in higher layers of $G_3$, and can be relieved through hidden layer supervision such as those disclosed by Lee et al 2015.

In order to improve the quality of generated boundary maps without adding too much extra calculation or increasing model complexity excessively, the design concept of holistically-nested architecture such as those disclosed by Xie and Tu (2015. Holistically-nested edge detection. In *Proceedings of the IEEE ICCV*, 1395-1403) is adopted, which inherits the idea of Lee et al 2015. However, rather than insert a side-output layer after each convolutional layer in $G_1$, a side-output layer is inserted after each transposed convolutional layer in $G_3$, and those inserted layers form the component $G_4$. Holistically-nested architecture has been proved superior in terms of both representation and computational complexity for multi-scale and multi-level learning, compared with other deep learning architectures with same purpose, and guides side-outputs towards the desired boundary predictions by imposing deep supervision i.e., red dotted line 710 in FIG. 7 on each side-output layer. Additionally, a weighted-fusion layer i.e., blue dotted line 720 in FIG. 7 is incorporated to combine the coarse, global information in higher layers with the fine, local information in lower layers, which shares similar idea with the skip-layer architecture such as those disclosed by Long, Shelhamer, and Darrell (2015. Fully convolutional networks for semantic segmentation. In *Proceedings of the IEEE CVPR*, 3431-3440).

Following the definition in Xie and Tu 2015, the parameters collection of $G_1$, $G_2$, and $G_3$ is denoted as $W$ $G_1$ and the weights of the N side-output layers in $G_4$ as $w=(w^1, \ldots, w^N)$. In the implementation disclosed herein, N equals 4. The class-balanced cross-entropy loss for each side-output $G_{side}^n$ (S, X) is computed over all the pixels of (S, X), Y) as shown in Equation 3.

$$\mathcal{L}_{side}(G_{side}^n(S, X), Y) = -\beta \sum_{j \in Y_+} \log P_r(y_j = 1 | (S, X); W, w^n)) - \qquad (3)$$
$$(1-\beta) \sum_{j \in Y_-} \log P_r(y_j = 0 | (S, X); W, w^n))$$

Where $S=(s_j, j=1, \ldots, |S|)$, $X=(x_j, j=1, \ldots, |X|)$ and $Y=(y_j, j=1, \ldots |Y|, y_j \in \{0, 1\}$. $|S|$, $|X|$, and $|Y|$ share the same value, representing the number of pixels in an image, and $|Y|$ is used subsequently for notation simplicity. $\beta = |Y_-|/|Y|$ and $1-\beta = |Y_+|/|Y|$, where $|Y_+|$ and $|Y_-|$ represents the number of pixels on and off the boundaries in ground truth boundary map, respectively. In FIG. 7, each side-output layer contains a 1×1 convolutional layer followed by an up-sampling layer and an activation function. The output of the nth side-output layer is shown in Equation 4.

$$G_{side}^n(S,X) = \sigma(A_{side}^n(S,X)) = \sigma(\text{UPSAMPLE}(O_{side}^n(S, X))) \qquad (4)$$

where $O_{side}^n(S, X)$ shown in FIG. 7 is the direct output of the 1×1 convolutional layer and $A_{side}^n(S, X) = a_j^n$, $j=1, \ldots, |Y|$ is the bilinear up-sampling of $O_{side}^n$ (S, X). Then, $G_{side}^n$ (S, X) is computed over $A_{side}^n$ (S, X) using sigmoid activation function. Finally, the output of weighted-fusion layer can be obtained according to Equation 5 with fusion weight defined as $h=(h_1, \ldots, h_N)$.

$$G_f(S, X) = \sigma(\sum_{n=1}^{N} h_n G_{side}^n(S, X)) \qquad (5)$$

EXAMPLES

Experimental Setup

Implementation Details In the training, the weight of feature matching loss $\lambda_{FM}=10$ and the weight of class-balanced cross-entropy loss $\lambda_{side}=5$. LSGANs such as those disclosed by Mao et al. 2017 is applied to stabilize the training process and the Adam algorithm such as those disclosed by Kingma and Ba (2014. Adam: A method for stochastic optimization. *arXiv preprint arXiv*: 1412.6980) with initial learning rate 0.0002 and momentum 0.5 is used for the optimization of both generator and discriminator.

Datasets Cityscapes dataset focuses on semantic understanding of urban street scenes. As disclosed herein, the Instance-Level Semantic Labeling task is targeted by using the 5000 fine-annotated images, which are divided into 2975 training images, 500 validation images and 1525 test images. Each image has a resolution of 2048×1024 and holds a complete ground-truth of semantic and instance segmentation for every pixel. The Sem3Ins model disclosed herein is trained on training set and evaluated on validation set and test set. The results in terms of mean Average Precision (AP) and mean Average Precision for an overlap value of 50% (AP0.5) are reported and both metrics are targeting at the instance segmentation of 8 thing classes: person, rider, car, truck, bus, train, motorcycle and bicycle.

Baselines A well-known model for instance segmentation, Mask R-CNN such as those disclosed by He et al. (2017. Mask r-cnn. In *Proceedings of the IEEE ICCV*, 2961-2969), is compared with Sem2Ins based on validation set and test set of Cityscapes dataset, in terms of AP, AP0.5, AP of each thing class, inference time per frame (i.e., s/frame) and frames per second (i.e., FPS (Over-all)). Official implementation such as those disclosed by FacebookResearch in 2017 of Mask R-CNN is used for comparison. Other works such as disclosed by He et al. 2017; Liu et al. (2017. Sgn: Sequential grouping networks for instance segmentation. In *Proceedings of the IEEE ICCV*, 3496-3504); Arnab and Torr (2017. Pixelwise instance segmentation with a dynamically instantiated network. In *Proceedings of the IEEE CVPR*, 441-450); Bai and Urtasun (2017. Deep watershed transform for instance segmentation. In *Proceedings of the IEEE CVPR*, 5221-5229); De Brabandere, Neven, and Van Gool (2017. Semantic instance segmentation with a discriminative loss function. *arXiv preprint arXiv*: 1708.02551); Hayder, He, and Salzmann 2017; Kirillov et al. (2017. Boundary-aware instance segmentation. In *Proceedings of the IEEE CVPR*, 5696-5704) with official results reported on Cityscapes leaderboard are compared with Sem2Ins on test set.

As shown in Table 3, Sem2Ins performs on par with some representative methods on the test set and achieves competitive results on Cityscapes leaderboard for Instance-Level Semantic Labeling task. image are not segmented in ground truth, but they can be successfully differentiated by Sem2Ins. Failure cases mostly involve incorrectly merging neighboring instances with similar colors or blurred boundaries, or splitting up a single

TABLE 3

Instance segmentation performance on the test set of Cityscapes officially reported on leaderboard (Cityscapesdataset Accessed September 2019)

| Method | AP | AP0.5 | person | rider | car | truck | bus | train | mcycle | bicycle |
|---|---|---|---|---|---|---|---|---|---|---|
| Mas R-CNN[fine-only] (He et al. 2017) | 26.2 | 49.9 | 30.5 | 23.7 | 46.9 | 22.8 | 32.2 | 18.6 | 19.1 | 16.0 |
| SGN (Liu et al. 2017) | 25.0 | 44.9 | 21.8 | 20.1 | 39.4 | 24.8 | 33.2 | 30.8 | 17.7 | 12.4 |
| Pixelwise DIN (Arnab and Torr 2017) | 23.4 | 45.2 | 21.0 | 18.4 | 31.7 | 22.8 | 31.1 | 31.0 | 19.6 | 11.7 |
| DWT (Bai and Urtasun 2017) | 19.4 | 35.3 | 15.5 | 14.1 | 31.5 | 22.5 | 27.0 | 22.9 | 13.9 | 8.0 |
| Discriminative Loss (De Brabandere, Neven, and Van Gool 2017) | 17.5 | 35.9 | 13.5 | 16.2 | 24.4 | 16.8 | 23.9 | 19.2 | 15.2 | 10.7 |
| Boundary-aware (Hayder, He, and Salzmann 2017) | 17.4 | 36.7 | 14.6 | 12.9 | 35.7 | 16.0 | 23.2 | 19.0 | 10.3 | 7.8 |
| InstanceCut (Kirillov et al. 2017) | 13.0 | 27.9 | 10.0 | 8.0 | 23.7 | 14.0 | 19.5 | 15.2 | 9.3 | 4.7 |
| Sem2Ins | 19.3 | 36.4 | 17.7 | 17.4 | 27.2 | 21.1 | 26.2 | 20.5 | 14.1 | 10.1 |

Note that Mask R-CNN model applies the ResNet-FPN-50 as backbone, and following the training and testing rules presented in He et al. 2017, it adopts scale-jitter data augmentation for training, that the image scale (shorter side) is randomly sampled from [800, 1024] to reduce overfitting; the inference is performed without any testing tricks. 'fine-only' means Mask R-CNN is trained only on the fine-annotated images of Cityscapes. For fair comparison, Sem2Ins follows the same rules to get final results on test set, and DPC such as those disclosed by Chen et al. 2018a is applied here for semantic segmentation. Specifically, Sem2Ins can deliver comparable performance with Mask R-CNN in terms of accuracy. In addition, Sem2Ins outperforms the work of De Brabandere, Neven, and Van Gool 2017, which claims real-time instance segmentation. Moreover, instances of only one thing class can be differentiated at a time in De Brabandere, Neven, and Van Gool 2017; however, Sem2Ins can differentiate all the instances belonging the 8 thing classes at a time.

object into multiple instances due to shelters in the front. For instance, a car on the right side of the 3rd sample is blocked partially by a billboard, then Sem2Ins incorrectly splits it up into two parts, and the right part is mistakenly identified as the rearview mirror of another car nearby, since the boundary between them is not obvious. Another common failure comes from inaccurate semantic segmentation since Sem2Ins takes semantic segmentation as the basis for boundary map generation. On the right side of the 5th sample, two neighboring people are differentiated as one instance, which is caused by the wrong semantic segmentation, where the nearby chairs and tables are recognized as a portion of people's body.

Figure 9:
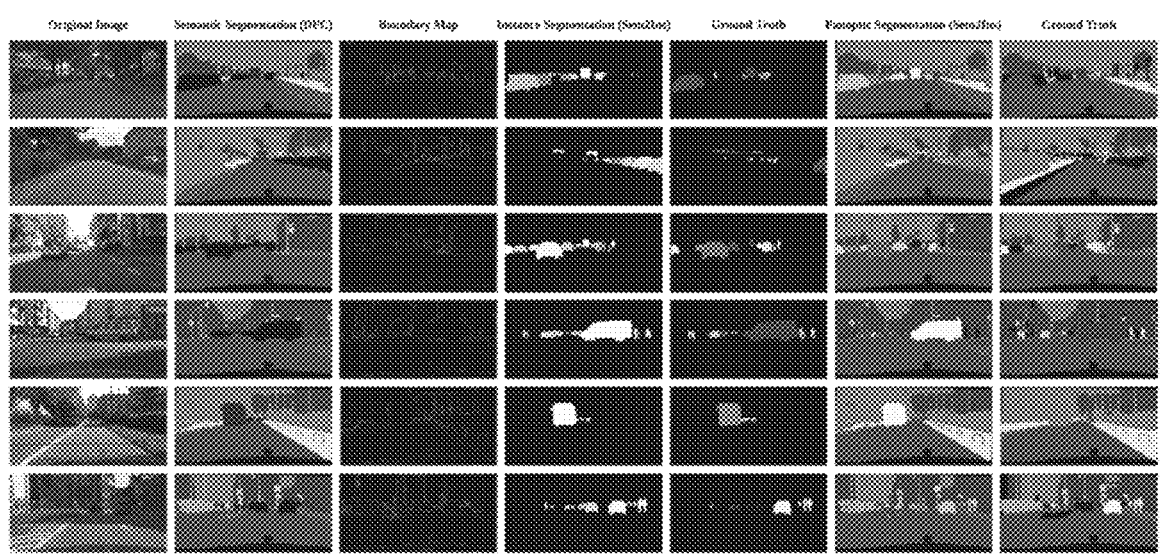
FIG. 9 are additional visual examples of instance segmentation and panoptic segmentation on the validation set of Cityscapes.

FIG. 9 is another visual examples of instance segmentation (4th & 5th column) and panoptic segmentation (6th & 7th column) on the validation set of Cityscapes. DPC (Chen et al. 2018a) is applied for semantic segmentation, with corresponding data listed in Table 4 below.

TABLE 4

Semantic & Panoptic segmentation performance on the validation set of Cityscapes. Sem-AP represents the AP of semantic segmentation and PQ represents the quality of panoptic segmentation computed by the public evaluation tool (Cordts 2016) of Cityscapes dataset.

| Method | Sem-AP | PQ | SQ | RQ | $PQ^{Th}$ | $SQ^{Th}$ | $RQ^{Th}$ | $PQ^{St}$ | $SQ^{St}$ | $RQ^{St}$ |
|---|---|---|---|---|---|---|---|---|---|---|
| PSPNet (Zhao et al. 2017) + Sem2Ins | 74.97 | 44.5 | 74.7 | 57.2 | 31.1 | 72.4 | 42.5 | 54.3 | 76.5 | 67.9 |
| AdaptNet++ (Valada, Mohan, and Burgard 2018) + Sem2Ins | 76.91 | 47.4 | 77.5 | 60.0 | 31.5 | 75.3 | 41.7 | 59.5 | 79.0 | 73.3 |
| DeepLabV3+ (Chen et al. 2018b) + Sem2Ins | 78.56 | 49.2 | 78.1 | 61.6 | 32.9 | 76.4 | 43.0 | 61.1 | 79.4 | 75.0 |
| DPC (Chen et al. 2018a) + Sem2Ins | 80.14 | 52.4 | 78.9 | 65.0 | 37.6 | 76.5 | 48.8 | 63.1 | 80.6 | 76.8 |
| Semantic_gd + Sem2Ins | — | 75.4 | 86.8 | 86.0 | 55.8 | 82.1 | 67.9 | 89.6 | 90.3 | 99.2 |

Figure 8:
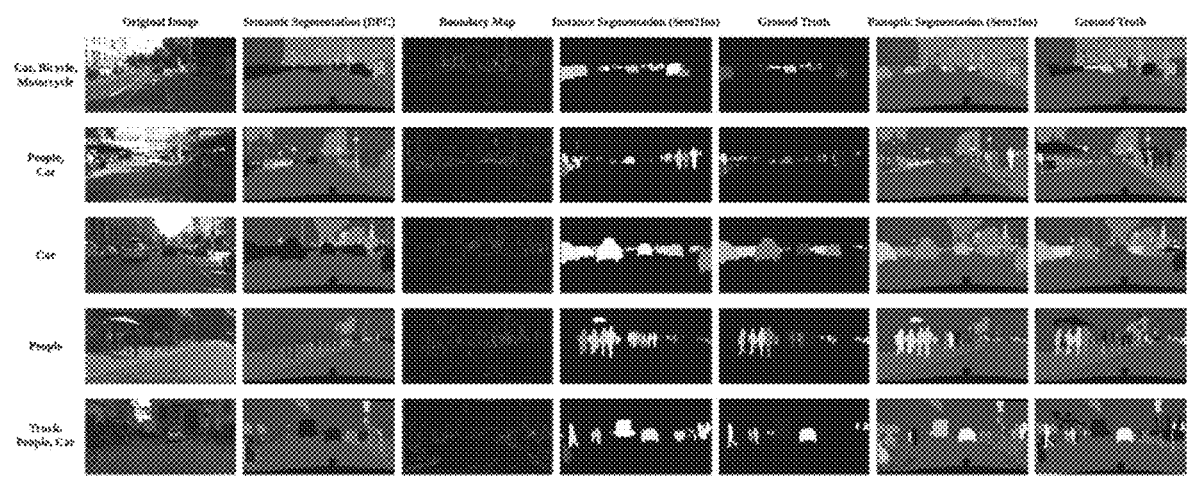
FIG. 8 are visual examples of instance segmentation and panoptic segmentation on the validation set of Cityscapes.

FIG. 8 presents visual results of 5 samples on validation set, which shows that Sem2Ins successfully handles most cases including various classes, even for some difficult cases with cars or pedestrians crowded together, e.g., 1st, 3rd and 4th sample. In addition, Sem2Ins can still give correct segmentation for some individual instances even if they are not labeled or segmented in ground truth. Take the 1st sample for instance, the car on the right side of image, which behind the motorcycle, is not labeled in ground truth; however, it can still be identified by Sem2Ins. For the 2nd sample, a crowd of people under umbrella on left side of Sem2Ins can work together with any semantic segmentation methods for instance segmentation and it is necessary and instructive to figure out the relationship between quality of semantic segmentation and performance of instance segmentation. In Table 4, the well-trained models online such as those disclosed by Nabavi 2018; DeepSceneSeg 2018; Tensorflow 2018 of 4 semantic segmentation methods, PSP-Net, AdaptNet++, DeepLabv3+ and DPC, respectively are applied for semantic segmentations and Sem2Ins is then to get instance segmentation.

TABLE 5

Semantic & Instance segmentation performance on the validation set of
Cityscapes. Sem-AP and Ins-AP represent the AP of Semantic & Instance
segmentation respectively, computed by the public evaluation tool (Cordts 2016) of
Cityscapes dataset.

| Method | Sem-AP | Ins-AP | AP0.5 | person | rider | car | truck | bus | train | mcycle | bicycle |
|---|---|---|---|---|---|---|---|---|---|---|---|
| Mask R-CNN[fine+COCO] (He et al. 2017) | — | 36.2 | 64.0 | 34.8 | 26.0 | 51.8 | 37.9 | 57.6 | 38.4 | 21.6 | 21.5 |
| Mask R-CNN[fine-only] (He et al. 2017) | — | 32.6 | 59.1 | 30.0 | 24.7 | 49.8 | 33.7 | 51.9 | 37.3 | 15.5 | 17.7 |
| PSPNet (Zhao et al. 2017) + Sem2Ins | 74.97 | 14.7 | 30.8 | 9.5 | 9.4 | 18.9 | 19.9 | 30.0 | 16.0 | 8.0 | 6.0 |
| AdaptNet++ (Valada, Mohan, and Burgard 2018) + Sem2Ins | 76.91 | 16.6 | 31.9 | 15.4 | 12.2 | 26.8 | 18.2 | 29.0 | 16.1 | 6.8 | 8.3 |
| DeepLabv3+(Chen et al. 2018b) + Sem2Ins | 78.56 | 17.9 | 33.3 | 15.4 | 13.3 | 27.1 | 19.5 | 33.0 | 17.3 | 9.2 | 8.9 |
| DPC (Chen et al. 2018a) + Sem2Ins | 80.14 | 20.5 | 37.4 | 17.9 | 17.5 | 29.3 | 24.0 | 38.7 | 12.6 | 13.9 | 10.2 |
| Semantic_gd + Sem2Ins | — | 39.6 | 63.1 | 35.0 | 40.9 | 34.9 | 61.4 | 50.9 | 32.3 | 35.6 | 25.5 |

Although the computed APs of the 4 semantic segmentation methods are not completely consistent with those reported in their papers, they are within a reasonable range. a better semantic segmentation, and that Sem2Ins is able to deliver the state-of-the-art performance if the semantic segmentation is sufficiently good.

TABLE 6

Speed & Accuracy analysis on the validation set of Cityscapes. Results listed
in the last three columns (i.e., s/frame, FPS (Overall) and FPS (Sem2In5)) are
computed on an NVIDIA Tesla P100 GPU. The time listed in s/frame column are written
in a form of CA or B+30A', where B' and CA' represents the time consumed on Semantic &
Instance segmentation respectively.

| Method | Input Dim | Sem-AP | Ins- | s/frame | FPS | FPS |
|---|---|---|---|---|---|---|
| Mask R-CNN[fine + COCO] (He et al. 2017) | 2048 × 1024 | — | 36.2 | 0.753 | 1.3 | — |
| Mask R-CNN[fine-only] (Heel al. 2017) | 2048 × 1024 | — | 32.6 | 0.597 | 1.7 | — |
| PSPNet (Zhao et al. 2017) + Sem2Ins | 2048 × 1024 | 74.97 | 14.7 | 0.021 + 300.0 | 20.0 | 34.5 |
| AdaptNet++ (Valada, Mohan, and Burgard 2018) + | 768 × 384 | 65.13 | 13.8 | 0.038 + 300.0 | 15.2 | 35.7 |
| | 1024 × 512 | 70.26 | 15.2 | 0.062 + 300.0 | 11.4 | 38.5 |
| | 2048 × 1024 | 76.91 | 16.6 | 0.193 + 300.0 | 4.5 | 32.3 |
| DeepLabv3+ (Chen et al. 2018b) + Sem2Ins | 768 × 384 | 69.14 | 15.2 | 0.175 + 300.0 | 4.9 | 34.5 |
| | 1024 × 512 | 73.18 | 16.2 | 0.293 + 300.0 | 3.1 | 31.3 |
| | 2048 × 1024 | 78.56 | 17.9 | 1.132 + 300.0 | 0.9 | 25.6 |
| DPC (Chen et al. 2018a) + Sem2Ins | 768 × 384 | 71.16 | 16.1 | 0.164 + 300.0 | 5.2 | 35.7 |
| | 1024 × 512 | 74.58 | 17.8 | 0.278 + 300.0 | 3.3 | 37.0 |
| | 2048 × 1024 | 80.14 | 20.5 | 1.086 + 300.0 | 0.9 | 40.0 |

Based on the row 4-7 of 2nd & 3rd column in Table 5, performance of instance segmentation (i.e., Ins-AP) using Sem2Ins grows with the quality of semantic segmentation (i.e., Sem-AP).

For further verification, the ground truth of semantic segmentation is input into Sem2Ins for instance segmentation and obtain a nearly perfect AP as shown in row 8 of 3rd column, which is higher than that of Mask R-CNN (row 3), even if Mask R-CNN is trained from a model pre-trained on MS-COCO dataset such as disclosed by Lin et al. (2014. Microsoft coco: Common objects in context. In ECCV, 740-755. Springer) (row 2). In addition, for some classes whose instances are always sparsely located (e.g., rider, truck, motorcycle), Sem2ins presents a large performance improvements compared with Mask R-CNN, which can be explained by the fact that semantic segmentation, serving as the basis for Sem2Ins, can deliver better performance compared with common instance segmentation method (e.g., Mask R-CNN), when targeting at single-instance object segmentation. Even for some classes whose instances are always crowded (e.g., person, bicycle, bus), Sem2Ins can still deliver comparable results. It is clear that the performance of instance segmentation can be improved by having Based on Table 6, Sem2Ins only introduces a minor computational overhead and inference latency (i.e., 'A' in s/frame column), so it is capable of processing HD images in real-time given semantic segmentation, e.g., it runs at over 25FPS (i.e., FPS (Sem2Ins)) for 2048×1024 images. Here, Sem2Ins provides a novel and practical way for fast instance segmentation: when semantic segmentation results are already obtained, instead of starting from original images, you can obtain their instance segmentation in a very short time based on semantic segmentation. In addition, when combined with semantic segmentation methods with higher speed (such as PSPNet), Sem2Ins can achieve real-time instance segmentation (i.e., 20FPS), which is more than 10× speedup over Mask R-CNN (i.e., <2FPS) for 2048× 1024 images.

Combined with 3 semantic segmentation methods: AdaptNet++, DeepLabv3+ and DPC, instance segmentation using Sem2Ins is performed for input images with 3 different resolutions (i.e., 768×384, 1024×512 and 2048×1024). Note that the semantic segmentation results are resized to 2048× 1024 when input to Sem2Ins. Based on Table 6, even if the quality of semantic segmentation (i.e., Sem-AP) decreases a lot for images with lower resolution (i.e., 768×384), the degradation of instance segmentation is relatively small. Take Sem2Ins combined with DeepLabv3+ for instance, when the resolution of input images changes from 2048×1024 to 768×384, the semantic segmentation AP decreases from 78.56 to 69.14, which is even lower than that of PSPNet (i.e., 74.97); however, the instance segmentation AP decreases from 17.9 to 15.2, which is higher than that of PSPNet (i.e., 14.7), and the overall speed (i.e., FPS (Overall)) increases for more than 5 times from 0.9 FPS to 4.9 FPS. Therefore, Sem2Ins is more robust to resolution decrease compared with semantic segmentation. Thus, when Sem2Ins is used for instance segmentation combined with semantic segmentation methods with higher quality (i.e., Sem-AP) but lower speed, it can be an appropriate way to sacrifice a small amount of accuracy (i.e., Ins-AP) in exchange for higher speed (i.e., FPS (Overall)) by decreasing resolution of input images.

Figure 10:
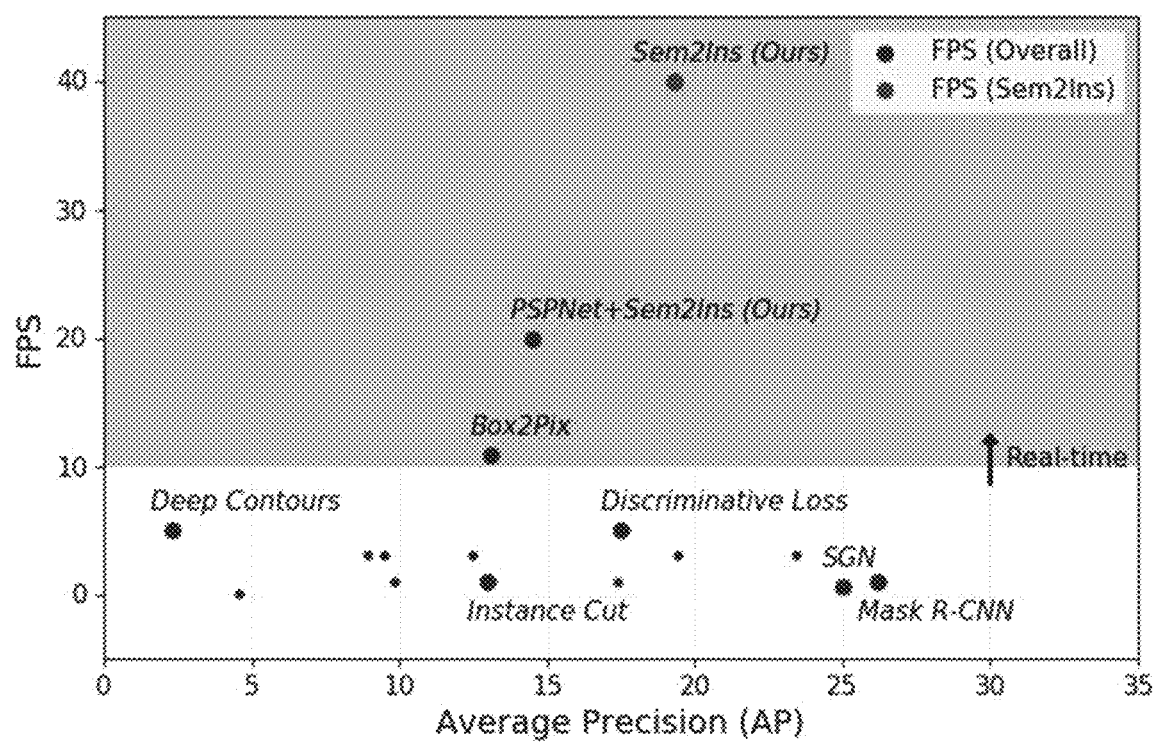
FIG. 10 is a schematic diagram showing speed accuracy trade-off of instance segmentation methods on Cityscapes dataset, according some embodiments of the present disclosure.

FIG. 10 is a schematic diagram showing speed accuracy trade-off of instance segmentation methods on Cityscapes dataset. PSPNet+Sem2Ins outperforms Box2Pix (Uhrig et al. 2018), claiming to be the SOTA real-time method, in terms of both speed and accuracy.

Figure 11:
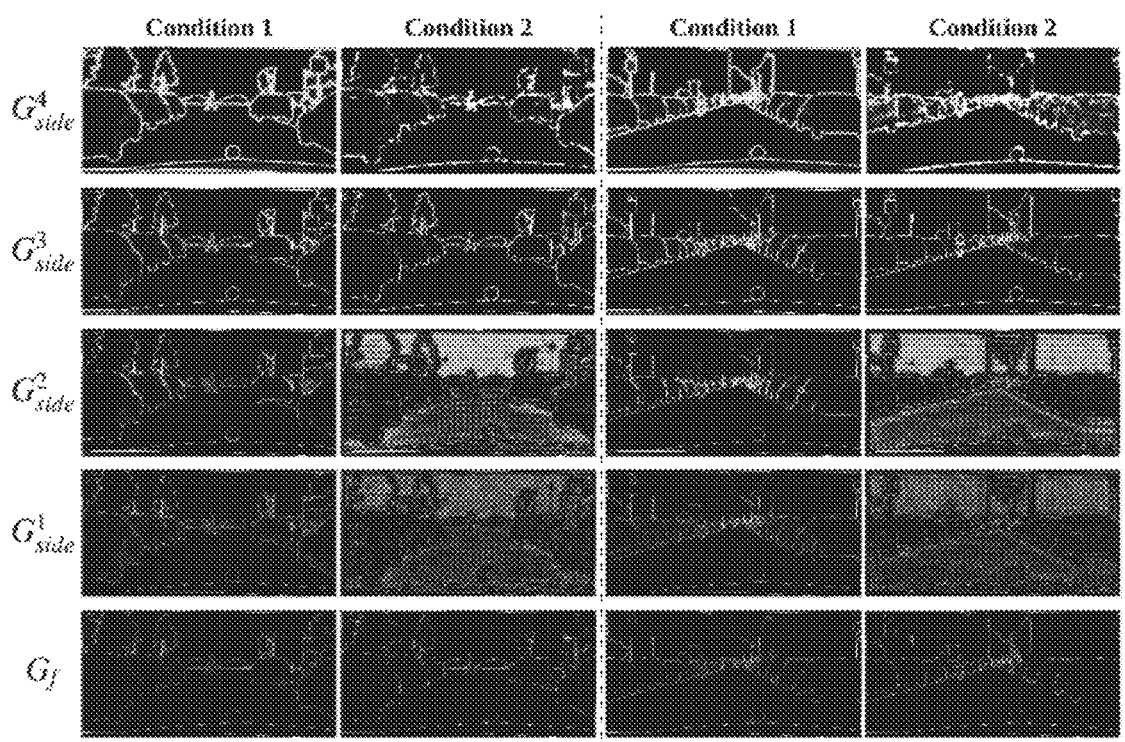
FIG. 11 shows two examples on the validation set of Cityscapes tested on two conditions.

In order to illustrate how deep supervision helps boundary map generation, FIG. 11 presents the output of each side-output layer (i.e., $G_{side}^n$) and the generated boundary map (i.e., Gr) for two examples in two conditions: 1) training with both weighted-fusion layer (i.e., blue dotted line 720 in FIG. 7) and deep supervision (i.e., red dotted line 710 in FIG. 7), and 2) training with weighted-fusion layer only. For both conditions, the side outputs from 4th layer to 1st layer become progressively finer and more "local". The boundary responses of condition 1 are obviously stronger than those of condition 2, especially for the boundaries between neighboring instances with same class (e.g., car) in 2nd layer and 3rd layer. For generated boundary map (i.e., $G_f$), the boundaries generated in condition 1 are clear and continuous, which lead to an instance segmentation with high performance; while the boundaries generated in condition 2 are incomplete, not clear and even absent, especially for the critical boundaries used for partitioning neighboring instances with same class, which lead to a common failure (i.e., incorrect merging neighboring instances) mentioned in Section 4.2. Thus, it appears the deep supervision guides Sem2Ins to generate boundaries with higher quality and further contributes to instance segmentation.

Sem2Ins can be easily extended to panoptic segmentation task, whose visual results are displayed in FIG. 8 and FIG. 9. Based on the panoptic quality (PQ) metric (Kirillov et al. 2019), experimental results of panoptic segmentation are shown in supplementary material. Unlike semantic segmentation, panoptic segmentation requires differentiating individual object instances, which can be solved by Sem2Ins through separating instances within a common semantic mask using boundaries, as shown in FIG. 8 and FIG. 9. Unlike instance segmentation, the object segments of panoptic segmentation must be non-overlapping; however, the proposal-based methods of instance segmentation can easily lead to overlapping masks. Sem2Ins cleverly avoids this problem by performing segmentation based on boundary map. In contrast to most recent works solving panoptic segmentation with a parallel structured network by handling stuff and things in different branches, Sem2Ins provides a cascaded method starting from semantic segmentation with boundary map acting as a bridge, which can further generate non-overlapping object segments of both stuff classes and thing classes at a time for panoptic segmentation.

In order to bridge the gap between semantic segmentation and instance segmentation, a novel real-time model called Sem2Ins is proposed for effective instance segmentation from a semantic segmentation through instances boundaries generation based on cGANs coupled with deep supervision as well as a weighted-fusion layer. Comprehensive experiments have been conducted on the widely-used Cityscapes bench-mark. The extensive experimental results have shown that 1) Sem2Ins is capable of processing HD images in real-time given semantic segmentation; 2) Sem2Ins can deliver comparable performance with Mask R-CNN in terms of accuracy when combined with a widely-used semantic segmentation method (such as DPC), while consistently outperforms a state-of-the-art real-time solution; 3) Sem2Ins can work flexibly with any semantic segmentation model for instance segmentation; 4) Sem2Ins can even outperform Mask R-CNN if the given semantic segmentation is sufficiently good; and 5) Sem2Ins can be easily extended to panoptic segmentation.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the example embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for obtaining an instance segmentation or panoptic segmentation of an image based on semantic segmentation, the system comprising:
    a storage medium storing a set of instructions; and
    a processor in communication with the storage medium to execute the set of instructions to:
        perform semantic segmentation on an input image to obtain a semantic label map having specific set of classes, using a trained semantic segmentation model;
        generate a boundary map, using a trained generator, based on the obtained semantic label map concatenated with the input image; and
        process the boundary map, using a post-processing step, to differentiate objects of the specific set of classes to obtain the instance segmentation or panoptic segmentation of the input image, wherein the post-processing step comprises performing Breadth-First-Search for each enclosed area of the semantic label map to get a mask for each enclosed area, a class of the mask being determined based on its semantic label map.

2. The system of claim 1, wherein the trained semantic segmentation model is DeepLabv3+.

3. The system of claim 1, wherein the trained semantic segmentation model is dense prediction cell (DPC).

4. The system of claim 1, wherein the trained generator comprises a conditional Generative Adversarial Networks (GANs) coupled with deep supervision as well as a weighted fusion layer.

5. The system of claim 1, wherein the system is able to obtain instance segmentation or panoptic segmentation in real time.

6. The system of claim 1, wherein the set of instructions further instructs the processor to generate masks for at least one of thing classes and stuff classes.

7. The system of claim 1, further comprising a discriminator that engages in a minimax game with a generator to form the trained generator, wherein the discriminator distinguishes between a boundary map generated by the trained generator and a corresponding boundary map of ground truth.

8. A method for obtaining an instance segmentation or panoptic segmentation of an image based on semantic segmentation, on a computing device including a storage medium storing a set of instructions, and a processor in communication with the storage medium to execute the set of instructions, the method comprising:
- performing semantic segmentation on an input image to obtain a semantic label map having specific set of classes, using a trained semantic segmentation model;
- generating a boundary map, using a trained generator, based on the obtained semantic label map concatenated with the input image; and
- processing the boundary map, using a post-processing step, to differentiate objects of the specific set of classes to obtain the instance segmentation or panoptic segmentation of the input image, wherein the post-processing step comprises performing Breadth-First-Search for each enclosed area of the semantic label map to get a mask for each enclosed area, a class of the mask being determined based on its semantic label map.

9. The method of claim 8, wherein the trained semantic segmentation model is DPC.

10. The method of claim 8, wherein the trained generator comprises a conditional Generative Adversarial Networks (GANs) coupled with deep supervision as well as a weighted fusion layer.

11. The method of claim 8, wherein the instance segmentation or panoptic segmentation is obtained in real time.

12. The method of claim 8, further comprising generating masks for at least one of thing classes and stuff classes.

13. The method of claim 8, further comprising using a discriminator to distinguish between a boundary map generated by the trained generator and a corresponding boundary map of ground truth to engage in a minimax game with a generator to form the trained generator.

14. A computer non-transitory readable medium, storing a set of instructions for obtaining an instance segmentation or panoptic segmentation of an image based on semantic segmentation, wherein when the set of instructions is executed by a processor of an electrical device, the electrical device performs a method comprising:
- performing semantic segmentation on an input image to obtain a semantic label map having specific set of classes, using a trained semantic segmentation model;
- generating a boundary map, using a trained generator, based on the obtained semantic label map concatenated with the input image; and
- processing the boundary map, using a post-processing step, to differentiate objects of the specific set of classes to obtain the instance segmentation or panoptic segmentation of the input image, wherein the instance segmentation or panoptic segmentation is obtained in real time, wherein the post-processing step comprises performing Breadth-First-Search for each enclosed area of the semantic label map to get a mask for each enclosed area, a class of the mask being determined based on its semantic label map.

15. The computer non-transitory readable medium of claim 14, wherein the trained semantic segmentation model is DPC and the trained generator comprises a conditional Generative Adversarial Networks (GANs) coupled with deep supervision as well as a weighted fusion layer.

16. The computer non-transitory readable medium of claim 14, the method further comprising generating masks for at least one of thing classes and stuff classes.

17. The computer non-transitory readable medium of claim 14, the method further comprising using a discriminator to distinguish between a boundary map generated by the trained generator and a corresponding boundary map of ground truth to engage in a minimax game with a generator to form the trained generator.

\* \* \* \* \*